(12) United States Patent
Tsujihata

(10) Patent No.: US 8,106,113 B2
(45) Date of Patent: Jan. 31, 2012

(54) INK COMPOSITION, IMAGE FORMING METHOD AND PRINTED ARTICLE

(75) Inventor: Shigetomo Tsujihata, Shizuoka-ken (JP)

(73) Assignee: Fujifilm Corporation, Tokyo (JP)

( * ) Notice: Subject to any disclaimer, the term of this patent is extended or adjusted under 35 U.S.C. 154(b) by 44 days.

(21) Appl. No.: 11/477,620

(22) Filed: Jun. 30, 2006

(65) Prior Publication Data

US 2007/0004823 A1 Jan. 4, 2007

(30) Foreign Application Priority Data

Jul. 1, 2005 (JP) ................................. 2005-194054

(51) Int. Cl.
*C09D 11/00* (2006.01)

(52) U.S. Cl. ...... 523/160; 523/161; 347/100; 106/31.27; 106/31.28

(58) Field of Classification Search .................. 523/160, 523/161

See application file for complete search history.

(56) References Cited

U.S. PATENT DOCUMENTS

| | | | | |
|---|---|---|---|---|
| 1,036,700 | A * | 8/1912 | Ida et al. ..................... | 200/19.03 |
| 3,686,283 | A | 8/1972 | Gresham | |
| 4,210,713 | A | 7/1980 | Sumiyoshi et al. | |
| 5,085,698 | A * | 2/1992 | Ma et al. ...................... | 524/388 |
| 5,153,095 | A | 10/1992 | Kawamura et al. | |
| 5,354,367 | A * | 10/1994 | Pennaz ......................... | 522/157 |
| 5,420,187 | A * | 5/1995 | Endo et al. ................... | 524/556 |
| 5,952,401 | A | 9/1999 | Kimura et al. | |
| 6,022,908 | A * | 2/2000 | Ma et al. ...................... | 523/160 |
| 6,194,480 | B1 * | 2/2001 | Takeda et al. ................... | 522/75 |
| 6,221,933 | B1 * | 4/2001 | Zhu et al. ...................... | 523/160 |
| 6,326,419 | B1 | 12/2001 | Smith | |
| 6,531,017 | B1 * | 3/2003 | Fukui et al. ................... | 156/235 |
| 6,569,603 | B2 | 5/2003 | Furukawa | |
| 6,596,793 | B2 * | 7/2003 | Yamashita et al. ............... | 524/99 |
| 6,949,591 | B1 | 9/2005 | Allard et al. | |
| 7,256,222 | B2 | 8/2007 | Ishizuka et al. | |
| 7,303,857 | B2 | 12/2007 | Goto | |
| 2002/0147252 | A1 * | 10/2002 | Adams ......................... | 523/161 |
| 2003/0109599 | A1 * | 6/2003 | Kamen ......................... | 523/160 |
| 2004/0063809 | A1 | 4/2004 | Fu et al. | |
| 2004/0069182 | A1 * | 4/2004 | Nakajima .................. | 106/31.13 |
| 2005/0012778 | A1 * | 1/2005 | Nishino et al. .................. | 347/29 |
| 2005/0223938 | A1 * | 10/2005 | Tyvoll .......................... | 106/31.6 |
| 2006/0071992 | A1 * | 4/2006 | Sarkisian et al. ............. | 347/100 |
| 2006/0100305 | A1 * | 5/2006 | Ma ................................ | 523/160 |
| 2006/0194029 | A1 | 8/2006 | Tsujihata | |

FOREIGN PATENT DOCUMENTS

| | | | |
|---|---|---|---|
| DE | 2339029 A1 | | 2/1974 |
| EP | 0 311 157 | * | 4/1989 |
| EP | 1243623 A1 | | 9/2002 |
| EP | 1270681 A2 | | 1/2003 |
| EP | 1650269 A2 | | 4/2006 |
| GB | 1036700 | * | 3/1965 |
| GB | 1424517 | | 2/1976 |
| GB | 2 314 851 A | | 1/1998 |
| JP | 6-207120 A | | 7/1994 |
| JP | 2002-188025 A | | 7/2002 |
| JP | 2002-241647 A | | 8/2002 |
| JP | 2003119414 A | | 4/2003 |
| JP | 2003-321628 A | | 11/2003 |
| JP | 2004-18656 A | | 1/2004 |
| JP | 2004-131589 A | | 4/2004 |

* cited by examiner

*Primary Examiner* — Vasu Jagannathan
*Assistant Examiner* — Doris Lee
(74) *Attorney, Agent, or Firm* — Sughrue Mion, PLLC

(57) ABSTRACT

Disclosed are an ink composition comprising at least a colorant (a) and a polymer (b) having a heterocyclic moiety forming a colorant, an image forming method including applying the ink composition to a recording medium by printing and curing the ink composition, and a printed article produced by curing the ink composition.

31 Claims, No Drawings

INK COMPOSITION, IMAGE FORMING METHOD AND PRINTED ARTICLE

CROSS-REFERENCE TO RELATED APPLICATION

This application claims priority under 35 USC 119 from Japanese Patent Application No. 2005-194054, the disclosure of which is incorporated by reference herein.

BACKGROUND OF THE INVENTION

1. Field of the Invention

The present invention relates to an ink composition that is preferably used for inkjet recording, an image forming method and a printed article produced by the image forming method. The invention relates, particularly, to an ink composition preferable for inkjet recording, the ink composition being superior in the dispersibility of a colorant so that it has excellent color developing ability, being cured by irradiation with an active energy ray and enabling the formation of a high quality image, an image forming method and a printed article produced by this image forming method.

2. Description of the Related Art

Electrophotographic systems, sublimation-type and melting-type thermal transfer systems, and inkjet systems are image recording methods of forming an image on a recording medium such as paper based on image data signals. In particular, inkjet systems are applicable to an inexpensive apparatus, and perform direct image formation on a recording medium by ejecting ink only to image areas where ink deposition is necessary; therefore, inkjet systems use ink effectively, thus reducing the running cost. Further, inkjet systems generate less noise and are superior image recording systems.

Inkjet systems enable printing on recording media that do not absorb water, such as plastic sheets and metallic plates, as well as on paper. In inkjet systems, it is an important target to achieve higher printing speed and higher printing quality, and the time that liquid droplets take to dry and cure after printing has significant influence on the sharpness of the image. In one inkjet system, an inkjet recording ink that can be cured by irradiation with an active energy ray is used. According to this system, sharp images can be formed by curing ink droplets by irradiation with an active energy ray just after printing.

In order to form highly accurate images with excellent coloring properties, such a curable ink composition is required to have high dispersibility of a colorant, particularly a pigment, and stability over time. Reduction in the colorant size is necessary for imparting clear tone and high tinting strength to the ink composition. In particular, ejected droplets of the inkjet ink exert a significant influence on the sharpness of images; therefore, the ejection quantity of the ink droplets needs to be small, and the size of the colorant particles contained in the ink has to be smaller than the thickness of the film formed by curing of the ink. However, when the size of the pigment particles is reduced so as to achieve higher tinting strength, the fine particles are hard to disperse, and aggregates are easily formed. Another problem is created in that the viscosity of the ink composition is increased by the addition of a dispersant. The formation of the colorant aggregates and the increase in the viscosity of the ink composition both adversely affect ink ejection property, and such an ink composition is not preferred.

When an ink composition is used in inkjet recording, the ink composition is contained in a cartridge. The ink composition in the cartridge is heated at ejection and cooled at a non-ejection time or at storage; in this way, the ink composition undergoes repeated temperature changes (heating-cooling). This temperature changes also adversely affect the colorant dispersibility, and the colorant dispersibility is deteriorated with time, whereby problems are created in that thickening and aggregation easily occurs.

Accordingly, there is a demand for an ink composition having sufficient fluidity and excellent stability of the colorant dispersion over time, in which fine colorant particles are dispersed stably. Various proposals have been made concerning dispersants for achieving stable colorant dispersion liquids.

For improving compatibility with the colorant, an ink composition using a pigment derivative as a dispersant (see e.g. Japanese Patent Application Laid-Open (JP-A) Nos. 2003-119414 and 2004-18656) and an ink composition that uses a polymer having a basic group as a dispersant for a specific pigment such as a phthalocyanine-based or quinacridone-based pigment (see e.g. JP-A No. 2003-321628) and an ink composition (see e.g. JP-A No. 2004-131589) which is free of organic solvent and contains a dispersant (e.g., a special polymer compound, poly(ethyleneimine)-poly(12-hydroxystearic acid) graft polymer) and a specific monomer that dissolves the dispersant have been proposed.

In this ink composition, the pigment dispersibility is actually improved owing to the function of the dispersant. However, the size of the pigment used in the ink composition is not sufficiently small, and there is a room for improvement of dispersibility of finer pigment particles. Further, the ink composition also has a problem in that the dispersion stability upon long-term storage or upon repeated temperature changes is still insufficient.

SUMMARY OF THE INVENTION

The present invention has been made in view of the above circumstances and provides an ink composition, an image forming method and a printed article.

A first aspect of the invention provides an ink composition comprising at least a colorant (a) and a polymer (b) having a heterocyclic moiety forming a colorant.

A second aspect of the invention provides an image forming method which comprises printing on a recording medium with the above ink composition and curing the ink composition by irradiating the applied ink composition with an active energy ray.

A third aspect of the invention provides a printed article produced by curing the above ink composition.

DETAILED DESCRIPTION OF THE INVENTION

The ink composition of the present invention comprises a colorant (a) and a polymer (b) (hereinafter referred to as a specific polymer (b)) having a heterocyclic moiety forming a colorant.

By including a polymerizable compound (c) in the ink composition of the invention, it can be cured when some energy is applied thereto. In this case, the ink composition preferably contains a polymerization initiator (d) and is therefore a composition to be cured by irradiation with an active energy ray. No particular limitation is imposed on the active energy ray insofar as it can impart energy which can generate initiating species in the ink composition by irradiation therewith. Examples of the energy ray include a wide range of energy rays such as α-rays, γ-rays, X-rays, ultraviolet rays, visible rays and electron rays. Among these energy rays, ultraviolet rays and electron rays are preferable, and ultraviolet rays are particularly preferable, from the viewpoint of curing sensitivity and the availability of equipment. Therefore, the ink composition of the invention is preferably an ink composition which contains a polymerizable compound and can be cured by irradiation with ultraviolet rays as the active energy ray.

Each structural component used in the ink composition of the invention will be hereinafter explained.

[(b) Polymer Having a Heterocyclic Moiety Forming a Colorant]

First, the polymer (b) (hereinafter referred to as a specific polymer (b)) having a heterocyclic moiety forming a colorant, which is a characteristic component of the invention, will be explained.

The specific polymer (b) in the invention is a polymer having a heterocyclic moiety forming a colorant. It is particularly preferable that the specific polymer (b) is used as a colorant dispersant. The presence of the heterocyclic moiety having high affinity to a colorant due to a van-der-waals interaction ensures good adsorbing ability with respect to the colorant, making it possible to obtain a stable dispersant.

Examples of the colorant (a) include organic pigments, oil-soluble dyes and water-soluble dyes. Among these materials, organic pigments are preferable. Specific examples of, particularly, the organic pigments include a phthalocyanine base, insoluble azo base, azo lake base, anthraquinone base, quinacridone base, dioxazine base, diketopyrrolopyrrole base, anthrapyrimidine base, anthanthrone base, indanthrone base, flavanthrone base, perinone base, perylene base, thioindigo base and quinophthalone base. Among these bases, a quinacridone base, anthraquinone base, diketopyrrolopyrrole base, quinophthalone base and insoluble azo base are preferable.

The hetero ring of the above heterocyclic moiety preferably has one hydrogen bond group in a molecule. Examples of the hetero ring include thiophene, furan, xanthene, pyrrole, imidazole, isoindoline, isoindolinone, benzimidazolone, indole, quinoline, carbazole, acridine, acridone, quinacridone, anthraquinone, phthalimide, quinaldine and quinophthalone. Among these hetero rings, benzimidazolone, indole, quinoline, carbazole, acridine, acridone, anthraquinone and phthalimide are particularly preferable.

The specific polymer (b) in the invention is preferably a polymer having a repeating unit represented by the following formula (1). When the polymer (b) is a high-molecular compound having the above specified repeating structure, the steric repulsive effect produced between a colorant and a high-molecular chain enables high dispersion stability.

Formula (1)

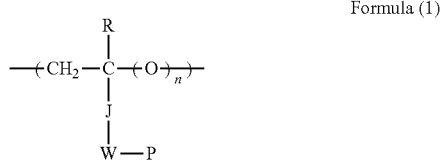

In the formula (1), R represents a hydrogen atom or a methyl group. J represents —CO—, —COO—, —CONR$^1$—, —OCO—, a methylene group or a phenylene group and is preferably —COO—, —CONH— or a phenylene group among these groups. R$^1$ represents a hydrogen atom, an alkyl group (for example, a methyl group, an ethyl group, a n-propyl group, an iso-propyl group, a n-butyl group, a n-hexyl group, a n-octyl group, a 2-hydroxyethyl group, a phenylmethyl group or a phenylethyl group) or an aryl group (for example, a phenyl group) and is preferably a hydrogen atom, a methyl group or an ethyl group.

W represents a single bond or a divalent connecting group. Examples of the divalent connecting group include straight-chain, branched or cyclic alkylene group, aralkylene group or arylene group, or combinations of these groups or each combination of these groups and —NR$^2$—, —NR$^2$R$^3$—, —COO—, —OCO—, —O—, —SO$_2$NH—, —NHSO$_2$—, —NHCOO— or —OCONH—, provided that these groups may respectively have a substituent.

As the alkylene group represented by the aforementioned W, alkylene groups having 1 to 10 carbon atoms are preferable and alkylene groups having 1 to 4 carbon atoms are more preferable. Examples of these alkylene groups include a methylene group, ethylene group, propylene group, butylene group, pentylene group, hexylene group, octylene group and decylene group. Among these groups, a methylene group, ethylene group, propylene group and the like are particularly preferable.

As the aralkylene group represented by the above W, aralkylene groups having 7 to 13 carbon atoms are preferable. Examples of the aralkylene group include a benzylidene group and cinnamylidene group.

As the arylene group represented by the above W, arylene groups having 6 to 12 carbon atoms. Examples of the arylene group include a phenylene group, cumenylene group, mesitylene group, tolylene group and xylylene group. Among these groups, a phenylene group is particularly preferable.

The above R$^2$ and R$^3$ independently represent hydrogen or an alkyl group. Preferable examples of R$^2$ or R$^3$ include hydrogen, a methyl group, ethyl group and propyl group.

Among connecting groups represented by the above W, a single bond and an alkylene group are particularly preferable and a methylene group, ethylene group and 2-hydroxypropylene group are preferable.

n denotes 0 or 1 and is preferably 0.

In the formula (1), P represents a heterocyclic moiety forming a colorant. Examples of the colorant include the aforementioned organic pigments, oil-soluble dyes and water-soluble dyes. The colorant is preferably organic pigments. The heterocyclic moiety is the same as the aforementioned heterocyclic moietys and the preferable examples are also the same.

These heterocyclic moieties are particularly preferably those similar to the pigments to be used. Specifically, in the case of quinacridone base pigments, for example, acridone or anthraquinone is particularly preferably used in the invention.

Specific examples of the unit represented by the above formula (1) will be given below. However, the invention is not limited to these examples.

M-1

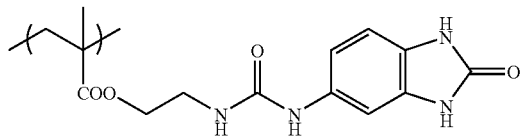

-continued
M-2
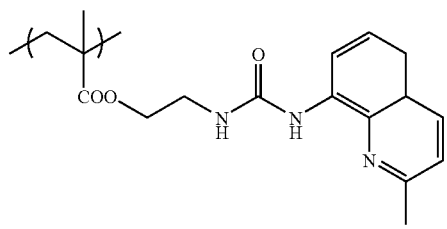
M-3
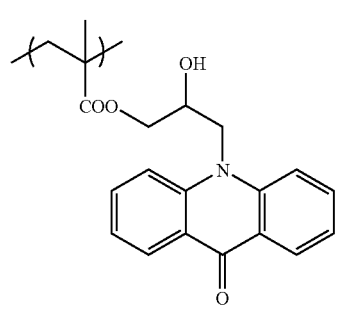
M-4
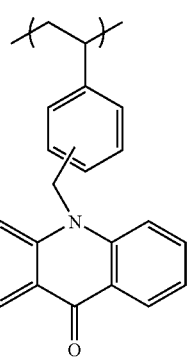
M-5
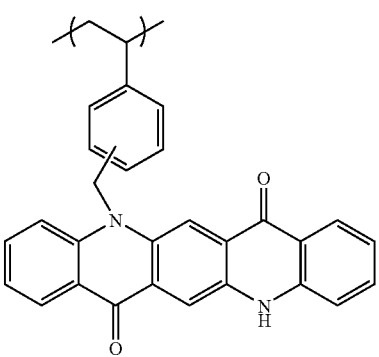
M-6
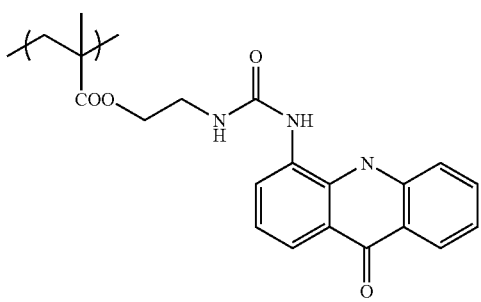
-continued
M-7
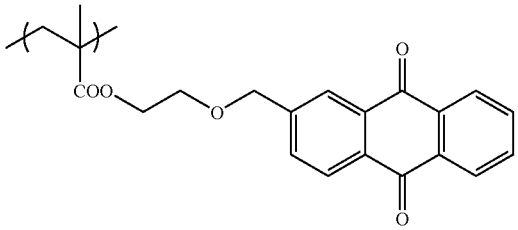
M-8
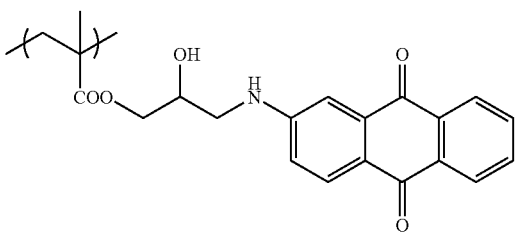
M-9
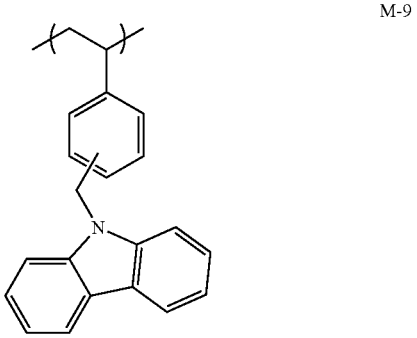
M-10
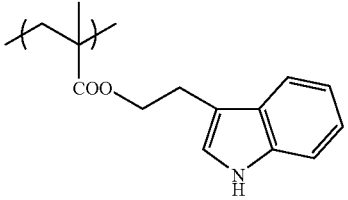
M-11
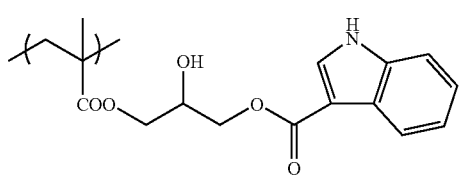
M-12
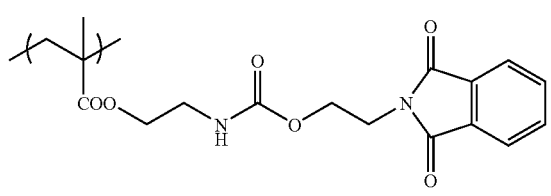
M-13

M-14

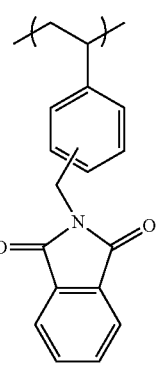

M-15

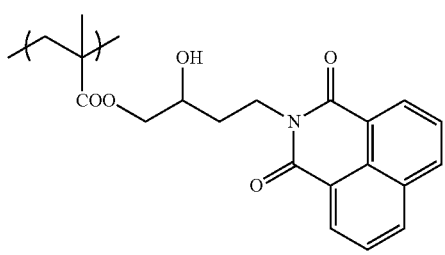

M-16

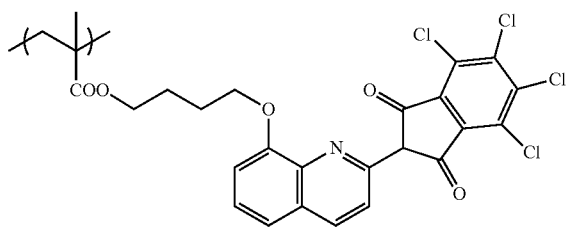

M-17

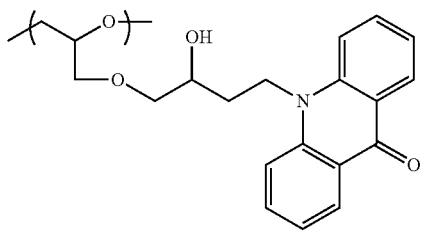

The specific polymer (b) according to the invention is particularly preferably a graft copolymer containing, as a copolymer unit, a polymerizable oligomer having an ethylenically unsaturated double bond at its terminal.

Such a polymerizable oligomer having an ethylenically unsaturated double bond at its terminal is a compound having a given molecular weight and is therefore called a macromonomer.

The polymerizable oligomer according to the invention contains a polymer chain moiety and a polymerizable functional group moiety at a terminal of the polymer chain. The polymerizable functional group moiety has an ethylenically unsaturated double bond. From the viewpoint of obtaining the desired graft polymer, the group having an ethylenically unsaturated double bond is preferably present at only one of the terminals of the polymer chain. The group having an ethylenically unsaturated double bond is preferably a (meth) acryloyl group or a vinyl group, particularly preferably a (meth)acryloyl group.

The polystyrene-equivalent number-average molecular weight (Mn) of the macromonomer is preferably in the range of 1000 to 10000, more preferably in the range of 2000 to 9000.

The polymer chain moiety is generally a homopolymer or copolymer formed from least one monomer selected from alkyl (meth)acrylates, styrene and derivatives thereof, acrylonitrile, vinyl acetate, and butadiene, or is polyethylene oxide, polypropylene oxide, and polycaprolactone.

The polymerizable oligomer is particularly preferably an oligomer represented by the following formula (2):

Formula (2)

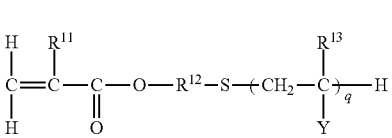

In the formula (2), $R^{11}$ and $R^{13}$ each independently represent a hydrogen atom or a methyl group.

$R^{12}$ represents an alkylene group having 1 to 12 carbon atoms (preferably an alkylene group having 2 to 4 carbon atoms, may have a substituent (for example, a hydroxyl group) and may contain an ester bond, ether bond or amide bond in the alkylene chain).

Y represents a phenyl group or —COOR$^{14}$. The phenyl group may be substituted and examples of the substituent include an alkyl group (for example, methyl and ethyl) having 1 to 4 carbon atoms. $R^{14}$ represents an alkyl group having 1 to 10 carbon atoms (for example, methyl, ethyl or benzyl) or a phenyl group. Among these groups, Y is preferably an unsubstituted phenyl group or —COOR$^{14}$ in which $R^{14}$ is an alkyl group having 1 to 4 carbon atoms.

q denotes a number from 20 to 200, preferably from 25 to 150 and particularly preferably from 30 to 100.

Preferable examples of the polymerizable oligomer (macromonomer) include a polymer in which a (meth)acryloyl group is bound to one terminal of polymethyl (meth)acrylate, poly-n-butyl (meth)acrylate, poly-i-butyl (meth)acrylate or polystyrene. Examples of commercially available polymerizable oligomers include a polystyrene oligomer having a methacryloyl group at one terminal (Mn=6000, trade name: AS-6, manufactured by Toagosei Co., Ltd.), a polymethyl methacrylate oligomer having a methacryloyl group at one terminal (Mn=6000, trade name: AA-6, manufactured by Toagosei Co., Ltd.), and a poly-n-butylacrylate oligomer having a methacryloyl group at one terminal (Mn=6000, trade name: AB-6, manufactured by Toagosei Co., Ltd.).

The above polymerizable oligomer is preferably not only polymerizable oligomers represented by the above formula (2) but also polymerizable oligomers represented by the following formula (3). These oligomers are particularly preferably selected appropriately corresponding to the polymerizable compound (c).

Formula (3)

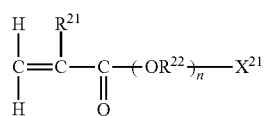

In the above formula (3), $R^{21}$ represents a hydrogen atom or a methyl group and $R^{22}$ represents an alkylene group having 1 to 8 carbon atoms. $X^{21}$ represents —OR$^{23}$ or —$OCOR^{24}$. Wherein, $R^{23}$ and $R^{24}$ independently represent a hydrogen atom, an alkyl group or an aryl group. n denotes a number from 2 to 200.

In the above formula (3), $R^{21}$ represents a hydrogen atom or a methyl group and is preferably a methyl group.

$R^{22}$ represents an alkylene group having 1 to 8 carbon atoms, is preferably an alkylene group having 1 to 6 carbon atoms and is more preferably an alkylene group having 2 to 3 carbon atoms.

$X^{21}$ represents —$OR^{23}$ or —$OCOR^{24}$. Wherein, $R^{23}$ is preferably a hydrogen atom, an alkyl group having 1 to 18 carbon atoms, a phenyl group or a phenyl group substituted with an alkyl group having 1 to 18 carbon atoms. $R^{24}$ is preferably an alkyl group having 1 to 18 carbon atoms and more preferably an alkyl group having 1 to 8 carbon atoms. Also, n denotes a number 2 to 200, more preferably 5 to 100 and particularly preferably 10 to 100.

Examples of the polymerizable oligomer represented by the above formula (3) include polyethylene glycol mono(meth)acrylate, polypropylene glycol mono(meth)acrylate, polyethylene glycol polypropylene glycol mono(meth)acrylate and polytetramethylene glycol monomethacrylate. These materials may be commercially available products or may be those synthesized properly.

The polymerizable monomers represented by the formula (3) according to the invention are commercially available. Examples of these commercially available products include methoxypolyethylene glycol methacrylate (trade name: NK ESTER M-40G, M-90G and M-230G (manufactured by Toagosei Co., Ltd.); trade name: BLENMER-PME-100, PME-200, PME-400, PME-1000, PME-2000 and PME-4000 (manufactured by Nippon Oil & Fats Co., Ltd.)), polyethylene glycol monomethacrylate (trade name: BLENMER-PE-90, PE-200 and PE-350 (manufactured by Nippon Oil & Fats Co., Ltd.)); polypropylene glycol monomethacrylate (trade name: BLENMER-PP-500, PP-800 and PP-1000 (manufactured by Nippon Oil & Fats Co., Ltd.)), polyethylene glycol polypropylene glycol monomethacrylate (trade name: BLENMER-70PEP-370B (manufactured by Nippon Oil & Fats Co., Ltd.)), polyethylene glycol polytetramethylene glycol monomethacrylate (trade name: BLENMER-55PET-800 (manufactured by Nippon Oil & Fats Co., Ltd.)) and polypropylene glycol polytetramethylene glycol monomethacrylate (trade name: BLENMER-NHK-5050 (manufactured by Nippon Oil & Fats Co., Ltd.)).

The specific polymer (b) used in the invention is particularly preferably a copolymer with a monomer having a nitrogen atom to make it easy for a polymer having a basic group to interact with an acidic pigment by an acid-base reaction.

[Nitrogen Atom-Containing Monomer]

Monomers represented by the following formula (4) are preferable as the polymer component of the pigment dispersant having nitrogen atom-containing group and an ethylenic unsaturated double bond.

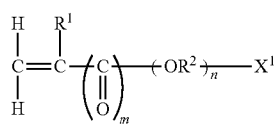

Formula (4)

In the above formula (4), $R^1$ represents a hydrogen atom or a methyl group, $R^2$ represents an alkylene group having 1 to 12 carbon atoms, $X^1$ represents —$N(R^3)(R^4)$, —$R^5$—$N(R^6)(R^7)$ or a basic heterocyclic group containing nitrogen. $R^3$, $R^4$, $R^6$ and $R^7$ independently represent a hydrogen atom, an alkyl group having 1 to 18 carbon atoms or an aryl group having 6 to 18 carbon atoms and $R^5$ represents an alkylene group having 1 to 12 carbon atoms. m and n independently denote a number of 1 or 0.

$R^2$ in the formula (4) represents an alkylene group having 1 to 12 carbon atoms, and is preferably an alkylene group having 1 to 6 carbon atoms and particularly preferably an alkylene group having 2 to 3 carbon atoms. $X^1$ is —$N(R^3)(R^4)$, —$R^5$—$N(R^6)(R^7)$ or a basic heterocyclic group containing nitrogen.

$R^3$, $R^4$, $R^6$ and $R^7$ independently represent a hydrogen atom, an alkyl group having 1 to 18 carbon atoms or an aryl group having 6 to 18 carbon atoms. As the alkyl group, alkyl groups having 1 to 12 carbon atoms are more preferable and alkyl groups having 1 to 6 carbon atoms are particularly preferable. As the aryl group, aryl groups having 6 to 12 carbon atoms are preferable and aryl groups having 6 to 10 carbon atoms are particularly preferable.

$R^5$ represents an alkylene group having 1 to 12 carbon atoms, and is preferably an alkylene group having 1 to 6 carbon atoms and particularly preferably an alkylene group having 2 to 3 carbon atoms.

As the basic heterocyclic group containing nitrogen of $X^1$, a pyridyl group (particularly, 1-pyridyl group and 2-pyridyl group), piperidino group (1-piperidino group), pyrrolidyl group (particularly, 2-pyrrolodyl group), pyrrolidino group, imidazolino group or morpholino group (4-morpholino group) are preferable, and a pyridyl group and imidazolino group are particularly preferable.

The monomer represented by the above formula (4) is particularly preferably a compound represented by any one of the following formulae (4-2) to (4-4).

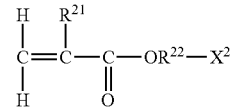

Formula (4-2)

Wherein, $R^{21}$ has the same meaning as $R^1$, $R^{22}$ has the same meaning as $R^2$ and $X^2$ has the same meaning as $X^1$.

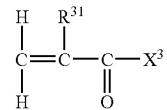

Formula (4-3)

Wherein, $R^{31}$ has the same meaning as $R^1$ and $X^3$ has the same meaning as $X^1$ (preferably, $X^3$ is —$N(R^{33})(R^{34})$ (wherein $R^{33}$ and $R^{34}$ have the same meanings as $R^3$ and $R^4$ corresponding to them), or —$R^{35}$—$N(R^{36})(R^{37})$ (wherein $R^{35}$, $R^{36}$ and $R^{37}$ have the same meanings as $R^5$, $R^6$ and $R^7$ corresponding to them)).

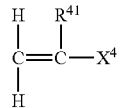

Formula (4-4)

Wherein, $R^{41}$ has the same meaning as $R^1$ and $X^4$ represents a pyrrolidino group, a pyrrolidyl group, a pyridyl group, a piperidino group or a morpholino group.

Preferable examples of the compound represented by the above formula (4) may include N,N-dimethylaminoethyl (meth)acrylate, N,N-dimethylaminopropyl(meth)acrylate, 1-(N,N-dimethylamino)-1,1-dimethylmethyl(meth)acrylate, N,N-dimethylaminohexyl(meth)acrylate, N,N-diethylaminoethyl(meth)acrylate, N,N-diisopropylaminoethyl(meth) acrylate, N,N-di-n-butylaminoethyl(meth)acrylate, N,N-di-i-butylaminoethyl(meth)acrylate, morpholinoethyl(meth) acrylate, piperidinoethyl(meth)acrylate, 1-pyrrolidinoethyl (meth)acrylate, N,N-methyl-2-pyrrolidylaminoethyl(meth) acrylate and N,N-methylphenylaminoethyl(meth)acrylate (the products mentioned above are (meth)acrylates); dimethyl(meth)acrylamide, diethyl(meth)acrylamide, diisopropyl (meth)acrylamide, di-n-butyl(meth)acrylamide, di-i-butyl (meth)acrylamide, morpholino(meth)acrylamide, piperidino (meth)acrylamide, N-methyl-2-pyrrolidyl(meth)acrylamide and N,N-methylphenyl(meth)acrylamide (the products mentioned above are (meth)acrylamides); 2-(N,N-dimethylamino)ethyl(meth)acrylamide, 2-(N,N-diethylamino)ethyl (meth)acrylamide, 3-(N,N-diethylamino)propyl(meth) acrylamide, 3-(N,N-dimethylamino)propyl(meth) acrylamide, 1-(N,N-dimethylamino)-1,1-dimethylmethyl (meth)acrylamide and 6-(N,N-diethylamino)hexyl(meth) acrylamide (the products mentioned above are aminoalkyl (meth)acrylamides); and vinylpyridine.

As the specific polymer (b) used in the invention, copolymers of these polymers and other copolymerizable monomers are preferable bases. Examples of these other copolymerizable monomers may include unsaturated carboxylic acids (for example, (meth)acrylic acids, crotonic acid, itaconic acid, maleic acid and fumaric acid), aromatic vinyl compounds (for example, styrene, α-methylstyrene, vinyltoluene, 2-vinylpyridine, 4-vinylpyridine and N-vinylimidazole), alkyl(meth) acrylates (for example, methyl(meth)acrylate, ethyl(meth) acrylate, n-butyl(meth)acrylate and i-butyl(meth)acrylate), alkylaryl(meth)acrylates (for example, benzyl(meth)acrylate), substituted alkyl(meth)acrylates (for example, glycidyl (meth)acrylate and 2-hydroxyethyl(meth)acrylate), vinyl carboxylates (for example, vinyl acetate and vinyl propionate), vinyl cyanates (for example, (meth)acrylonitrile and α-chloroacrylonitrile) and aliphatic conjugate dienes (for example, 1,3-butadiene and isoprene). Among these compounds, unsaturated carboxylic acids, alkyl(meth)acrylates, alkylaryl(meth)acrylates and vinyl carboxylates are preferable.

The specific polymer (b) of the invention is particularly preferably copolymers comprising a unit represented by the above formula (1) and a unit given from the above polymerizable oligomer (macro-monomer) or copolymers comprising a unit represented by the above formula (1), a unit derived from a unit given from the above polymerizable oligomer (macro-monomer) and a unit given from a monomer having a nitrogen atom. The above copolymer preferably contains the repeating unit represented by the formula (1) in a ratio by weight of 5 to 50% (particularly, 5 to 30% by weight) based on all repeating units. The above copolymer preferably contains the repeating unit given from the above polymerizable oligomer (macro-monomer) in a ratio by weight of 30 to 80% (particularly, 50 to 80% by weight) based on all repeating units. The above copolymer preferably contains the repeating unit derived from the above monomer containing nitrogen containing group in a ratio by weight of 5 to 80% (particularly, 5 to 50% by weight) based on all repeating units.

When the additional monomer copolymerizable therewith is used, the quantity of the repeating units derived from the additional monomer is preferably in the range of 5 to 30 wt % based on the total quantity of the repeating units in the copolymer. The weight-average molecular weight (Mw) of the copolymer is preferably in the range of 1000 to 200000, particularly preferably in the range of 10000 to 100000. This weight-average molecular weight is a polystyrene-equivalent weight-average molecular weight determined by gel permeation chromatography (in which tetrahydrofuran is used as the carrier).

Examples of the above graft copolymer that can be preferably used as the specific polymer (b) will be shown below; however, these examples are not intended to limit the invention.

1) A copolymer of a monomer, and polymethylmethacrylate having a methacryloyl group at one terminal, which provides the above exemplified compound M-1 (weight ratio: 10:90).

2) A copolymer of a monomer, and polyethylene glycol mono(meth)acrylate, which provides the above exemplified compound M-1 (weight ratio: 15:85).

3) A copolymer of a monomer, and polycaprolactone having a methacryloyl group at its terminal, which provides the above exemplified compound M-1 (weight ratio: 20:80).

4) A copolymer of a monomer, and polymethylmethacrylate having a methacryloyl group at its terminal, which provides the above exemplified compound M-4 (weight ratio: 10:90).

5) A copolymer of a monomer, and polyethylene glycol mono(meth)acrylate, which provides the above exemplified compound M-4 (weight ratio: 20:80).

6) A copolymer of a monomer, and polycaprolactone having a methacryloyl group at its terminal, which provides the above exemplified compound M-4 (weight ratio: 25:75).

7) A copolymer of a monomer, 3-(N,N-dimethylamino) propylacrylamide, and polymethylmethacrylate having a methacryloyl group at one terminal, which provides the above exemplified compound M-4 (weight ratio: 10:20:70).

8) A copolymer of a monomer, 3-(N,N-dimethylamino) propylacrylamide, and polyethylene glycol mono(meth)acrylate, which provides the above exemplified compound M-4 (weight ratio: 15:25:60).

9) A copolymer of a monomer, 3-(N,N-dimethylamino) propylacrylamide, polymethylmethacrylate having a methacryloyl group at one terminal, and polyethylene glycol mono (meth)acrylate, which provides the above exemplified compound M-4 (weight ratio: 8:22:50:20).

10) A copolymer of a monomer, 2-(N,N-dimethylamino) ethyl(meth)acrylate, and polymethylmethacrylate having a methacryloyl group at one terminal, which provides the above exemplified compound M-4 (weight ratio: 8:42:50).

11) A copolymer of a monomer, 2-vinylpyridine, and polymethylmethacrylate having a methacryloyl group at one terminal, which provides the above exemplified compound M-4 (weight ratio: 20:30:50).

12) A copolymer of a monomer, p-vinylbenzyl-N,N-dimethylamine, and polyethylene glycol mono(meth)acrylate, which provides the above exemplified compound M-4 (weight ratio: 7:43:50).

13) A copolymer of a monomer, 3-(N,N-dimethylamino) ethyl(meth)acrylate, and poly n-butylmethacrylate having a methacryloyl group at one terminal, which provides the above exemplified compound M-4 (weight ratio: 10:10:80).

14) A copolymer of a monomer, styrene, and polymethylmethacrylate having a methacryloyl group at one terminal, which provides the above exemplified compound M-4 (weight ratio: 15:15:70).

15) A copolymer of a monomer, N,N-dimethylacrylamide, and polymethylmethacrylate having a methacryloyl group at one terminal, which provides the above exemplified compound M-4 (weight ratio: 20:10:70, or 5:25:70).

16) A copolymer of a monomer, 3-(N,N-dimethylamino)propylacrylamide, and polymethylmethacrylate having a methacryloyl group at one terminal, which provides the above exemplified compound M-6 (weight ratio: 10:40:50).

17) A copolymer of a monomer, 3-(N,N-dimethylamino)propylacrylamide, and polyethylene glycol mono(meth)acrylate, which provides the above exemplified compound M-6 (weight ratio: 15:15:70).

18) A copolymer of a monomer, 3-(N,N-dimethylamino)propylacrylamide, and polymethylmethacrylate having a methacryloyl group at one terminal, which provides the above exemplified compound M-6 (weight ratio: 10:20:70).

19) A copolymer of a monomer, 3-(N,N-dimethylamino)ethyl(meth)acrylate, and polymethylmethacrylate having a methacryloyl group at one terminal, which provides the above exemplified compound M-13 (weight ratio: 25:25:50).

20) A copolymer of a monomer, 4-vinylpyridine, and polymethylmethacrylate having a methacryloyl group at one terminal, which provides the above exemplified compound M-13 (weight ratio: 5:25:75).

21) A copolymer of a monomer, 3-(N,N-dimethylamino)ethyl(meth)acrylate, and polyethylene glycol mono(meth)acrylate, which provides the above exemplified compound M-13 (weight ratio: 10:30:60).

22) A copolymer of a monomer, 3-(N,N-dimethylamino)ethyl(meth)acrylate, and polymethylmethacrylate having a methacryloyl group at one terminal, which provides the above exemplified compound M-14 (weight ratio: 15:25:60).

Such graft polymers can be obtained by radical polymerization, in a solvent, of the polymerizable oligomer and, optionally, the monomer having a nitrogen-containing group and/or other additional monomers. In this polymerization, a radical polymerization initiator is used in general. In addition to the initiator, a chain transfer agent (e.g., 2-mercaptoethanol and dodecyl mercaptan) may be further added for the synthesis of the graft polymer.

In the ink composition of the invention, the specific polymers (b) may be used either alone or in combinations of two or more. The content of the specific polymer (b) in the ink composition is preferably 1 to 100% by weight, more preferably 2 to 80% by weight and still more preferably 5 to 50% by weight based on the amount of the colorant to be added. It is preferable to add the specific polymer in an amount of 1 to 100% by weight based on the amount of the colorant to be added because this improves the dispersibility of fine colorants and the stability of the dispersion and hence imparts vivid color tone and improves high tinting strength significantly.

In the ink composition of the invention, a known colorant dispersant may be used together in addition to the specific polymer (b) insofar as the effect of the invention is not impaired. The amount of the colorant dispersant to be added is preferably 50% by weight or less based on the specific polymer (b).

[Polymerizable Compound (c)]

It is preferable to contain the polymerizable compound (c) in the ink composition, and an ink composition which can be cured by irradiation with an active energy ray and is preferable for inkjet recording and an image forming method using the ink composition can be provided by compounding the polymerizable compound (c) in the ink composition. Also, the applied ink composition by printing can be cured by irradiation with an active energy ray, which enables the formation of a high quality image obtained by the ink composition providing a sharp color tone and high tinting strength.

Any polymerizable compound may be used as the polymerizable compound (c) to be used in the invention without any particular limitation insofar as it causes a polymerization reaction and is cured by supplying some energy. Though a monomer, oligomer and polymer may be used regardless of type, various known polymerizable monomers known as a photo-cationic polymerizable monomer or photo-radical polymerizable monomer is preferable which causes a polymerization reaction by initiator species generated from, particularly, the polymerization initiator (d) which is added as desired.

The polymerizable compounds may be used either alone or in combinations of two or more with the intention of regulating reaction speed, ink properties and the properties of a cured film. Also, the polymerizable compounds may be either a monofunctional compound or a polyfunctional compound.

Examples of cation-polymerizable monomers usable as the polymerizable compound (c) include the epoxy compounds, vinyl ether compounds, and oxetane compounds described in JP-A No. 6-9714, JP-A No. 2001-31892, JP-A No. 2001-40068, JP-A No. 2001-55507, JP-A No. 2001-310938, JP-A No. 2001-310937 and JP-A No. 2001-220526.

Examples of the epoxy compounds include aromatic epoxides and aliphatic epoxides.

Examples of monofunctional epoxy compounds usable in the invention include phenyl glycidyl ether, p-tert-butylphenyl glycidyl ether, butyl glycidyl ether, 2-ethylhexyl glycidyl ether, allyl glycidyl ether, 1,2-butylene oxide, 1,3-butadiene monoxide, 1,2-epoxydodecane, epichlorohydrin, 1,2-epoxydecane, styrene oxide, cyclohexene oxide, 3-methacryloyloxymethylcyclohexene oxide, 3-acryloyloxymethylcyclohexene oxide, and 3-vinylcyclohexene oxide.

Examples of multifunctional epoxy compounds include bisphenol A diglycidyl ether, bisphenol F diglycidyl ether, bisphenol S diglycidyl ether, brominated bisphenol A diglycidyl ether, brominated bisphenol F diglycidyl ether, brominated bisphenol S diglycidyl ether, epoxy novolak resin, hydrogenated bisphenol A diglycidyl ether, hydrogenated bisphenol F diglycidyl ether, hydrogenated bisphenol S diglycidyl ether, 3,4-epoxycyclohexyl methyl-3',4'-epoxycyclohexane carboxylate, 2-(3,4-epoxycyclohexyl-5,5-spiro-3,4-epoxy) cyclohexane-metha-dioxane, bis(3,4-epoxycyclohexylmethyl) adipate, vinylcyclohexene oxide, 4-vinylepoxycyclohexane, bis(3,4-epoxy-6-methylcyclohexylmethyl) adipate, 3,4-epoxy-6-methylcyclohexyl-3',4'-epoxy-6'-methylcyclohexane carboxylate, methylenebis(3,4-epoxycyclohexane), dicylopentadiene diepoxide, ethyleneglycol di(3,4-epoxycyclohexylmethyl) ether, ethylenebis(3,4-epoxycyclohexane carboxylate), dioctyl epoxyhexahydrophthalate, di-2-ethylhexyl epoxyhexahydrophthalate, 1,4-butanediol diglycidyl ether, 1,6-hexanediol diglycidyl ether, glycerin triglycidyl ether, trimethylolpropane triglycidyl ether, polyethylene glycol diglycidyl ether, polypropylene glycol diglycidyl ethers, 1,1,3-tetradecadiene dioxide, limonene dioxide, 1,2,7,8-diepoxy octane, and 1,2,5,6-diepoxy cyclooctane.

Among these epoxy compounds, aromatic epoxides and alicyclic epoxides are preferable since they are advantageous in respect of the curing rate. Alicyclic epoxides are particularly preferable.

Examples of monofunctional vinyl ethers usable in the invention include methyl vinyl ether, ethyl vinyl ether, propyl vinyl ether, n-butyl vinyl ether, t-butyl vinyl ether, 2-ethylhexyl vinyl ether, n-nonyl vinyl ether, lauryl vinyl ether, cyclohexyl vinyl ether, cyclohexyl methyl vinyl ether, 4-methylcyclohexylmethyl vinyl ether, benzyl vinyl ether, dicyclopentenyl vinyl ether, 2-dicyclopentenoxy ethyl vinyl ether, methoxyethyl vinyl ether, ethoxyethyl vinyl ether, butoxyethyl vinyl ether, methoxyethoxyethyl vinyl ether, ethoxyethoxyethyl vinyl ether, methoxy polyethylene glycol vinyl ether, tetrahydrofurfuryl vinyl ether, 2-hydroxyethyl vinyl ether, 2-hydroxypropyl vinyl ether, 4-hydroxybutyl vinyl ether, 4-hydroxymethyl cyclohexylmethyl vinyl ether, diethylene glycol monovinyl ether, polyethylene glycol vinyl ether, chloroethyl vinyl ether, chlorobutyl vinyl ether, chloroethoxyethyl vinyl ether, phenylethyl vinyl ether, and phenoxy polyethylene glycol vinyl ether.

Examples of multifunctional vinyl ethers include: divinyl ethers such as ethylene glycol divinyl ether, diethylene glycol divinyl ether, polyethylene glycol divinyl ether, propylene glycol divinyl ether, butylene glycol divinyl ether, hexane diol divinyl ether, bisphenol A alkylene oxide divinyl ether, and bisphenol F alkylene oxide divinyl ether; and multifunctional vinyl ethers such as trimethylolethane trivinyl ether, trimethylolpropane trivinyl ether, ditrimethylolpropane tetravinyl ether, glycerin trivinyl ether, pentaerythritol tetravinyl ether, dipentaerythritol pentavinyl ether, dipentaerythritol hexavinyl ether, ethylene oxide-added trimethylolpropane trivinyl ether, propylene oxide-added trimethylolpropane trivinyl ether, ethylene oxide-added ditrimethylolpropane tetravinyl ether, propylene oxide-added ditrimethylolpropane tetravinyl ether, ethylene oxide-added pentaerythritol tetravinyl ether, propylene oxide-added pentaerythritol tetravinyl ether, ethylene oxide-added dipentaerythritol hexavinyl ether, and propylene oxide-added dipentaerythritol hexavinyl ether.

From the viewpoint of curing properties, adhesion to a recording medium, and the surface hardness of an image formed, the vinyl ether compound is preferably a di- or trivinyl ether compound, particularly preferably a divinyl ether compound.

The oxetane compound usable in the invention refers to a compound having an oxetane ring. Such an oxetane compound may be selected arbitrarily from known oxetane compounds such as described in JP-A No. 2001-220526, JP-A No. 2001-310937, and JP-A No. 2003-341217. The compound having an oxetane ring usable in the ink composition of the invention is preferably a compound having 1 to 4 oxetane rings in its structure. By using such a compound, the viscosity of the ink composition can be maintained in a range which enables easy handling, and the ink after curing adheres strongly to the recording medium.

Examples of monofunctional oxetanes usable in the invention include 3-ethyl-3-hydroxymethyl oxetane, 3-(meth)allyloxymethyl-3-ethyl oxetane, (3-ethyl-3-oxetanylmethoxy) methyl benzene, 4-fluoro-[1-(3-ethyl-3-oxetanylmethoxy) methyl]benzene, 4-methoxy-[1-(3-ethyl-3-oxetanylmethoxy)methyl]benzene, [1-(3-ethyl-3-oxetanylmethoxy)ethyl]phenyl ether, isobutoxymethyl(3-ethyl-3-oxetanylmethyl) ether, isobornyloxyethyl(3-ethyl-3-oxetanylmethyl) ether, isobornyl(3-ethyl-3-oxetanylmethyl) ether, 2-ethylhexyl(3-ethyl-3-oxetanylmethyl) ether, ethyldiethylene glycol(3-ethyl-3-oxetanylmethyl) ether, dicyclopentadiene (3-ethyl-3-oxetanylmethyl) ether, dicyclopentenyloxyethyl (3-ethyl-3-oxetanylmethyl) ether, dicyclopentenyl (3-ethyl-3-oxetanylmethyl) ether, tetrahydrofurfuryl (3-ethyl-3-oxetanylmethyl) ether, tetrabromophenyl (3-ethyl-3-oxetanylmethyl) ether, 2-tetrabromophenoxyethyl (3-ethyl-3-oxetanylmethyl) ether, tribromophenyl (3-ethyl-3-oxetanylmethyl) ether, 2-tribromophenoxyethyl (3-ethyl-3-oxetanylmethyl) ether, 2-hydroxyethyl (3-ethyl-3-oxetanylmethyl) ether, 2-hydroxypropyl (3-ethyl-3-oxetanylmethyl) ether, butoxyethyl (3-ethyl-3-oxetanylmethyl) ether, pentachlorophenyl (3-ethyl-3-oxetanylmethyl) ether, pentabromophenyl (3-ethyl-3-oxetanylmethyl) ether, and bornyl(3-ethyl-3-oxetanylmethyl) ether.

Examples of multifunctional oxetanes include 3,7-bis(3-oxetanyl)-5-oxa-nonane, 3,3'-(1,3-(2-methylenyl) propanediylbis(oxymethylene)) bis-(3-ethyloxetane), 1,4-bis [(3-ethyl-3-oxetanylmethoxy)methyl]benzene, 1,2-bis[(3-ethyl-3-oxetanylmethoxy)methyl]ethane, 1,3-bis[(3-ethyl-3-oxetanylmethoxy)methyl]propane, ethylene glycol bis(3-ethyl-3-oxetanylmethyl) ether, dicyclopentenyl bis(3-ethyl-3-oxetanylmethyl) ether, triethylene glycol bis(3-ethyl-3-oxetanylmethyl) ether, tetraethylene glycol bis(3-ethyl-3-oxetanylmethyl) ether, tricyclodecanediyldimethylene (3-ethyl-3-oxetanylmethyl) ether, trimethylolpropane tris(3-ethyl-3-oxetanylmethyl) ether, 1,4-bis(3-ethyl-3-oxetanylmethoxy) butane, 1,6-bis(3-ethyl-3-oxetanylmethoxy) hexane, pentaerythritol tris(3-ethyl-3-oxetanylmethyl) ether, pentaerythritol tetrakis(3-ethyl-3-oxetanylmethyl) ether, polyethylene glycol bis(3-ethyl-3-oxetanylmethyl) ether, dipentaerythritol hexakis(3-ethyl-3-oxetanylmethyl) ether, dipentaerythritol pentakis(3-ethyl-3-oxetanylmethyl) ether, dipentaerythritol tetrakis(3-ethyl-3-oxetanylmethyl) ether, caprolactone-modified dipentaerythritol hexakis(3-ethyl-3-oxetanylmethyl) ether, caprolactone-modified dipentaerythritol pentakis(3-ethyl-3-oxetanylmethyl) ether, ditrimethylolpropane tetrakis(3-ethyl-3-oxetanylmethyl) ether, EO-modified bisphenol A bis(3-ethyl-3-oxetanylmethyl) ether, PO-modified bisphenol A bis(3-ethyl-3-oxetanylmethyl) ether, EO-modified hydrogenated bisphenol A bis(3-ethyl-3-oxetanylmethyl) ether, PO-modified hydrogenated bisphenol A bis(3-ethyl-3-oxetanylmethyl) ether, and EO-modified bisphenol F (3-ethyl-3-oxetanylmethyl) ether.

Such compounds having oxetane rings are described in detail in columns [0021] to [0084] of JP-A 2003-341217 supra, and the compounds described therein can be preferably used in the present invention as well.

Among the oxetane compounds, a compound having one or two oxetane rings is preferable from the viewpoint of the viscosity and adhesiveness of the ink composition.

In the ink composition of the invention, only one polymerizable compound may be used, or two or more polymerizable compounds may be used. From the viewpoint of effective suppression of shrinkage upon curing, it is preferable to use a combination of at least one oxetane compound and at least one compound selected from epoxy compounds and vinyl ether compounds.

In the invention, the polymerizable compound (c) may be selected from a wide variety of known radical polymerizable monomers that undergo polymerization reaction in the presence of an initiator species generated from a photo-radical initiator.

Examples of such radical polymerizable monomers include (meth)acrylates, (meth)acrylamides, and aromatic vinyls. In the specification, the term "(meth)acrylate" is occasionally used to mean "acrylate" and/or "methacrylate", and the term "(meth)acryl" is occasionally used to mean "acryl" and/or "methacryl".

Examples of (meth)acrylates usable in the invention include the followings.

Examples of monofunctional (meth)acrylates include hexyl (meth)acrylate, 2-ethylhexyl (meth)acrylate, tert-octyl (meth)acrylate, isoamyl (meth)acrylate, decyl (meth)acrylate, isodecyl (meth)acrylate, stearyl (meth)acrylate, isostearyl (meth)acrylate, cyclohexyl (meth)acrylate, 4-n-butylcyclohexyl (meth)acrylate, bornyl (meth)acrylate, isobornyl (meth)acrylate, benzyl (meth)acrylate, 2-ethylhexyldiglycol (meth)acrylate, butoxyethyl (meth)acrylate, 2-chloroethyl (meth)acrylate, 4-bromobutyl (meth)acrylate, cyanoethyl (meth)acrylate, benzyl (meth)acrylate, butoxymethyl (meth)acrylate, 3-methoxybutyl (meth)acrylate, alkoxymethyl (meth)acrylate, alkoxyethyl (meth)acrylate, 2-(2-methoxyethoxy)ethyl (meth)acrylate, 2-(2-butoxyethoxy)ethyl (meth)acrylate, 2,2,2-tetrafluoroethyl (meth)acrylate, 1H,1H,2H,2H-perfluorodecyl (meth)acrylate, 4-butylphenyl (meth)acrylate, phenyl (meth)acrylate, 2,4,5-tetramethylphenyl (meth)acrylate, 4-chlorophenyl (meth)acrylate, phenoxymethyl (meth)acrylate, phenoxyethyl (meth)acrylate, glycidyl (meth)acrylate, glycidyloxybutyl (meth)acrylate, glycidyloxyethyl (meth)acrylate, glycidyloxypropyl (meth)acrylate, tetrahydrofurfuryl (meth)acrylate, hydroxyalkyl (meth)acrylate, 2-hydroxyethyl (meth)acrylate, 3-hydroxypropyl (meth)acrylate, 2-hydroxypropyl (meth)acrylate, 2-hydroxybutyl (meth)acrylate, 4-hydroxybutyl (meth)acrylate, 3-hydroxypropyl (meth)acrylate, dimethylaminoethyl (meth)acrylate, diethylaminoethyl (meth)acrylate, dimethylaminopropyl (meth)acrylate, diethylaminopropyl (meth)acrylate, trimethoxysilylpropyl (meth)acrylate, trimethylsilylpropyl (meth)acrylate, polyethylene oxide monomethyl ether (meth)acrylate, oligoethylene oxide monomethyl ether (meth)acrylate, polyethylene oxide (meth)acrylate, oligoethylene oxide (meth)acrylate, oligoethylene oxide monoalkyl ether (meth)acrylate, polyethylene oxide monoalkyl ether (meth)acrylate, dipropylene glycol (meth)acrylate, polypropylene oxide monoalkyl ether (meth)acrylate, oligopropylene oxide monoalkyl ether (meth)acrylate, 2-methacryloyloxytylsuccinic acid, 2-methacryloyloxyhexahydrophthalic acid, 2-methacryloyloxyethyl-2-hydroxypropyl phthalate, butoxydiethylene glycol (meth)acrylate, trifluoroethyl (meth)acrylate, perfluorooctylethyl (meth)acrylate, 2-hydroxy-3-phenoxypropyl (meth)acrylate, EO-modified phenol (meth)acrylate, EO-modified cresol (meth)acrylate, EO-modified nonyl phenol (meth)acrylate, PO-modified nonyl phenol (meth)acrylate, and EO-modified 2-ethylhexyl (meth)acrylate.

Examples of bifunctional (meth)acrylates include 1,6-hexanediol di(meth)acrylate, 1,10-decanediol di(meth)acrylate, neopentyl glycol di(meth)acrylate, 2,4-dimethyl-1,5-pentanediol di(meth)acrylate, butylethylpropanediol (meth)acrylate, ethoxylated cyclohexane methanol di(meth)acrylate, polyethylene glycol di(meth)acrylate, oligoethylene glycol di(meth)acrylate, ethylene glycol di(meth)acrylate, 2-ethyl-2-butyl-butanediol di(meth)acrylate, hydroxypivalic acid neopentyl glycol di(meth)acrylate, EO-modified bisphenol A di(meth)acrylate, bisphenol F polyethoxy di(meth)acrylate, polypropylene glycol di(meth)acrylate, oligopropylene glycol di(meth)acrylate, 1,4-butanediol di(meth)acrylate, 2-ethyl-2-butylpropanediol di(meth)acrylate, 1,9-nonane di(meth)acrylate, propoxylated ethoxylated bisphenol A di(meth)acrylate, and tricyclodecane di(meth)acrylate.

Examples of trifunctional (meth)acrylates include trimethylolpropane tri(meth)acrylate, trimethylolethane tri(meth)acrylate, trimethylolpropane alkylene oxide-modified tri(meth)acrylate, pentaerythritol tri(meth)acrylate, dipentaerythritol tri(meth)acrylate, trimethylolpropane tri((meth)acryloyloxypropyl) ether, isocyanuric acid alkylene oxide-modified tri(meth)acrylate, propionic acid dipentaerythritol tri(meth)acrylate, tri((meth)acryloyloxyethyl) isocyanurate, hydroxypival aldehyde-modified dimethylolpropane tri(meth)acrylate, sorbitol tri(meth)acrylate, propoxylated trimethylolpropane tri(meth)acrylate, and ethoxylated glycerin triacrylate.

Examples of tetrafunctional (meth)acrylates include pentaerythritol tetra(meth)acrylate, sorbitol tetra(meth)acrylate, ditrimethylolpropane tetra(meth)acrylate, propionic acid dipentaerythritol tetra(meth)acrylate, and ethoxylated pentaerythritol tetra(meth) acrylate.

Examples of pentafunctional (meth)acrylates include sorbitol penta(meth)acrylate and dipentaerythritol penta(meth)acrylate.

Examples of hexafunctional (meth)acrylates include dipentaerythritol hexa(meth)acrylate, sorbitol hexa(meth)acrylate, phosphazene alkylene oxide-modified hexa(meth)acrylate, and caprolactone-modified dipentaerythritol hexa (meth)acrylate.

Examples of (meth)acrylamides usable in the invention include (meth)acrylamide, N-methyl (meth)acrylamide, N-ethyl (meth)acrylamide, N-propyl (meth)acrylamide, N-n-butyl (meth)acrylamide, N-t-butyl (meth)acrylamide, N-butoxymethyl (meth)acrylamide, N-isopropyl (meth)acrylamide, N-methylol (meth)acrylamide, N,N-dimethyl (meth)acrylamide, N,N-diethyl (meth)acrylamide, and (meth)acryloyl morpholine.

Examples of aromatic vinyls usable in the invention include styrene, methyl styrene, dimethyl styrene, trimethyl styrene, ethyl styrene, isopropyl styrene, chloromethyl styrene, methoxy styrene, acetoxy styrene, chlorostyrene, dichlorostyrene, bromostyrene, methyl vinylbenzoate, 3-methyl styrene, 4-methyl styrene, 3-ethyl styrene, 4-ethyl styrene, 3-propyl styrene, 4-propyl styrene, 3-butyl styrene, 4-butyl styrene, 3-hexyl styrene, 4-hexyl styrene, 3-octyl styrene, 4-octyl styrene, 3-(2-ethylhexyl) styrene, 4-(2-ethylhexyl) styrene, allyl styrene, isopropenyl styrene, butenyl styrene, octenyl styrene, 4-t-butoxycarbonyl styrene, 4-methoxy styrene, and 4-t-butoxy styrene.

Examples of the radical polymerizable monomer usable in the invention include vinyl esters [vinyl acetate, vinyl propionate, vinyl versate etc.], allyl esters [allyl acetate etc.], halogen-containing monomers [vinylidene chloride, vinyl chloride etc.], vinyl ethers [methyl vinyl ether, butyl vinyl ether, hexyl vinyl ether, methoxy vinyl ether, 2-ethyl hexyl vinyl ether, methoxyethyl vinyl ether, cyclohexyl vinyl ether, chloroethyl vinyl ether etc.] and vinyl cyanides [(meth)acrylonitrile etc.], and olefins [ethylene, propylene etc.].

Among these, the radical polymerizable monomer in the invention is preferably a (meth)acrylates or a (meth)acrylamides from the viewpoint of the curing rate, and particularly preferably a tetrafunctional or higher-functional (meth)acrylate from the viewpoint of the curing rate. From the viewpoint of the viscosity of the ink composition, it is preferable to use a combination of a multifunctional (meth)acrylate such as described above and a monofunctional or bifunctional (meth)acrylate or (meth)acrylamide.

The content of the polymerizable compound (c) in the ink composition is preferably 50 to 95 wt %, more preferably 60 to 92 wt %, still more preferably 70 to 90 wt %, based on the total solid content of the composition.

Colorant (a)

The ink composition of the invention contains a colorant as an essential component. Owing to the function of the specific polymer (b), colorant having a very small particle diameter can be dispersed uniformly and stably in the ink composition, thus enabling the formation of sharp images excellent in coloring property with the ink composition of the invention.

The colorant used herein is not particularly limited, and may be selected from a wide variety of known pigments and dyes depending on the applications. Because the pigment is contained as a colorant, the images obtained by using the ink composition of the invention are especially excellent in weather resistance.

The pigments that are preferably used in the invention will be explained.

As the pigment, organic pigments and inorganic pigments that are usually available on the market and also, pigments obtained by dyeing resin particles with dyes may be used without any particular limitation. In addition, commercially available pigment dispersants and surface treated pigments, for example, those obtained by dispersing pigments as a dispersion medium in an insoluble resin or those obtained by grafting a resin on the surface of a pigment may be used insofar as they do not impair the effect of the invention.

Examples of these pigments include the pigments described, for example, in Seijiro Itoh, "Dictionary of Pigments" (2000), W. Herbst and K. Hunger, "Industrial Organic Pigments", and JP-A Nos. 2002-12607, 2002-188025, 2003-26978, and 2003-342503, the disclosures of which are incorporated herein by reference.

Specific examples of the organic and inorganic pigments for use in the invention include the following. Examples of pigments of yellow color include: monoazo pigments such as C.I. Pigment Yellow 1 (Fast Yellow G, etc.) and C.I. Pigment Yellow 74; disazo pigments such as C.I. Pigment Yellow 12 (Disazo Yellow AAA, etc.) and C.I. Pigment Yellow 17; non-benzidine azo pigments such as C.I. Pigment Yellow 180; azolake pigments such as C.I. Pigment Yellow 100 (tartrazine yellow lake, etc.); condensation azo pigments such as C.I. Pigment Yellow 95 (Condensation Azo Yellow GR, etc.); acidic-dye lake pigments such as C.I. Pigment Yellow 115 (quinoline yellow lake, etc.); basic-dye lake pigments such as C.I. Pigment Yellow 18 (thioflavin lake, etc.); anthraquinone pigments such as fravantrone yellow (Y-24); isoindolinone pigments such as isoindolinone yellow 3RLT (Y-110); quinophtharone pigments such as quinophtharone yellow (Y-138); isoindoline pigments such as isoindoline yellow (Y-139); nitroso pigments such as C.I. Pigment Yellow 153 (nickel nitroso yellow, etc.); and metal-complex-salt azomethine pigments such as C.I. Pigment Yellow 117 (copper azomethine yellow, etc.).

Examples of red or magenta pigments include: monoazo pigments such as C.I. Pigment Red 3 (toluidine red, etc.); disazo pigments such as C.I. Pigment Red 38 (Pyrazolone Red B, etc.); azolake pigments such as C.I. Pigment Red 53:1 (Lake Red C, etc.) and C.I. Pigment Red 57:1 (Brilliant Carmine 6B); condensation azo pigments such as C.I. Pigment Red 144 (Condensation Azo Red BR, etc.); acidic dye lake pigments such as C.I. Pigment Red 174 (Phloxine B Lake, etc.); basic dye lake pigments such as C.I. Pigment Red 81 (Rhodamine 6G' Lake, etc.); anthraquinone pigments such as C.I. Pigment Red 177 (dianthraquinolyl red, etc.); thioindigo pigments such as C.I. Pigment Red 88 (Thioindigo Bordeaux, etc.); perynone pigments such as C.I. Pigment Red 194 (perynone red, etc.); perylene pigments such as C.I. Pigment Red 149 (perylene scarlet, etc.); quinacridone pigments such as C.I. Pigment Violet 19 (unsubstituted quinacridone) and C.I. Pigment Red 122 (quinacridone magenta, etc.); isoindolinone pigments such as C.I. Pigment Red 180 (Isoindolinone Red 2BLT, etc.); and alizarin lake pigments such as C.I. Pigment Red 83 (madder lake, etc.).

Examples of blue or cyan pigments include disazo pigments such as C.I. Pigment Blue 25 (dianisidine blue, etc.); phthalocyanine pigments such as C.I. pigment blue 15 (phthalocyanine blue, etc.); acidic dye lake pigments such as C.I. pigment blue 24 (peacock blue lake, etc.); basic dye lake pigments such as C.I. Pigment Blue 1 (Victoria Pure Blue BO Lake, etc.); anthraquinone pigments such as C.I. pigment blue 60 (indanthron blue, etc.); and alkali blue pigments such as C.I. Pigment Blue 18 (alkali blue V-5:1).

Examples of green pigments include phthalocyanine pigments such as C.I. Pigment Green 7 (phthalocyanine green) and C.I. Pigment Green 36 (phthalocyanine green); and azo metal complex pigments such as C.I. Pigment Green 8 (nitroso green).

Examples of orange pigments include isoindoline pigments such as C.I. Pigment Orange 66 (isoindoline orange); and anthraquinone pigments such as C.I. Pigment Orange 51 (dichloropyranthron orange).

Examples of black pigments include carbon black, titanium black, and aniline black.

Specific examples of white pigments include basic lead carbonate ($2PbCO_3Pb(OH)_2$, so-called silver white), zinc oxide (ZnO, so-called zinc white), titanium oxide ($TiO_2$, so-called titanium white), and strontium titanate ($SrTiO_3$, so-called titanium strontium white).

Since titanium oxide has a lower specific gravity and a higher refractive index than other white pigments and is more stable chemically or physically, titanium oxide has a greater masking and coloring potential as a pigment, and is further excellent in resistance to acid or alkali and other environmental factors. Thus, the use of titanium oxide as a white pigment is preferable. Of course, other white pigment (including white pigments other than those described above) may be used as necessary.

For dispersing the colorant, dispersing machines such as a ball mill, a sand mill, an attriter, a roll mill, a jet mill, a homogenizer, a paint shaker, a kneader, an agitator, a Henschel mixer, a colloid mill, an ultrasonic wave homogenizer, a pearl mill, and a wet jet mill, may be used.

When the colorant is dispersed, it is preferable to add the specific polymer (b).

A synergist suitable for the colorant may be used as a dispersing aid as necessary. The amount of dispersing aid is preferably 1 to 50 parts by weight per 100 parts by weight of the colorant.

In the ink composition, a solvent may be added as the dispersion medium for various components such as colorant, or the polymerizable compound (c), which is a low-molecular-weight component, may be used as a solvent-free dispersion medium. The ink composition according to the invention is preferably free of solvent because the composition is preferably an activated energy radiation-curable ink that is cured after applied onto a recording medium. If the solvent remains in the cured ink image, solvent resistance may be deteriorated and a problem of VOC (Volatile Organic Compound) may occur. Thus, the dispersion medium is preferably a polymerizable compound (c), particularly preferably a polymerizable compound having the lowest viscosity, in view of the improvement in the dispersibility and handling property of the ink composition.

A colorant having a smaller diameter is more excellent in coloring properties. Therefore, the average particle diameter of the pigment to be used is preferably in the range of about 0.01 to 0.4 μm, more preferably in the range of 0.02 to 0.2 μm. The maximum particle diameter may be 3 μm or less, preferably 1 μm or less; such a maximum particle diameter can be achieved by appropriate selections of the colorant (a), the dispersant, the dispersing medium, the dispersion conditions, and the filtration conditions. By controlling the particle diameter, clogging in a head nozzle can be prevented, and the storage stability of ink, the transparency of ink, and the curing sensitivity can be secured. Because the specific polymer (b) excellent in dispersibility and stability is used in the invention, a uniform and stable dispersion can be obtained even when fine colorant particles having a very small particle diameter is used.

The particle diameter of the colorant in the ink composition can be measured by a known measurement method. Specifically, the particle diameter can be measured by a centrifugal-sedimentation light-transmission method, an X-ray transmission method, a laser diffraction/scattering method, or a dynamic light scattering method. In the invention, the values obtained by measurement using a laser diffraction/scattering method are adopted.

The amount of the colorant in the ink composition may be 1 to 20 wt %, more preferably 2 to 10 wt %, in terms of solid content.

In the ink composition of the invention, various additives may be used additionally depending on the purpose, in addition to the above-described essential components. Hereinafter, these optional components are described.

[Polymerization Initiator (d)]

The ink composition of the invention preferably contains a radical polymerization initiator or a cation polymerization initiator and particularly preferably contains a photo-polymerization initiator in an embodiment containing a polymerizable compound.

The polymerization initiator in the invention is a compound that is changed chemically through the action of light and an interaction with a sensitizing dye put in an electron excited state to produce at least any of a radical, an acid and a base. Particularly, the initiator used in the invention is preferably the above photo-radical initiator or a photo-acid generator from the viewpoint of initiating polymerization by such a simple means as exposure.

The photopolymerization initiator may be selected appropriately from initiators having sensitivity to the activated ray for irradiation, such as UV ray at 400 to 200 nm, far UV ray, g-line, h-line, i-line, KrF excimer laser light, ArF excimer laser light, electron ray, X-ray, molecular beam, or ion beam.

Specifically, any of common photopolymerization initiators known in the art may be used. Specific examples thereof are described, for example, in Bruce M. Monroe et al., Chemical Revue, 93, 435 (1993); R, S. Davidson, Journal of Photochemistry and biology, A: Chemistry, 73, 81 (1993); J. P. Faussier, "Photoinitiated Polymerization-Theory and Applications": Rapra Review vol. 9, Report, Rapra Technology (1998); and M. Tsunooka et al., Prog. Polym. Sci., 21, 1 (1996), the disclosures of which are incorporated herein by reference. Many compounds favorably used in chemical-amplification photoresists and for photocationic polymerization are also described in Japanese Research Association for Organic Electronics Materials Ed., "Organic Materials for Imaging" (published by Bun-Shin Shuppan (1993), pp. 187 to 192), the disclosure of which is incorporated herein by reference. The compounds that undergo oxidative or reductive bond cleavage through the interaction with the electronically-excited state of sensitizing dye are also known, and described, for example in F. D. Saeva, Topics in Current Chemistry, 156, 59 (1990); G. G. Maslak, Topics in Current Chemistry, 168, 1 (1993); H. B. Shuster et al., JACS, 112, 6329 (1990); I. D. F. Eaton et al., JACS, 102, 3298 (1980), the disclosures of which are incorporated herein by reference.

Preferable examples of such photopolymerization initiators include (a) aromatic ketones, (b) aromatic onium salt compounds, (c) organic peroxides, (d) hexaarylbiimidazole compounds, (e) ketoxime ester compounds, (f) borate compounds, (g) azinium compounds, (h) metallocene compounds, (i) active ester compounds, and (j) compounds containing a carbon-halogen bond.

Preferable examples of the aromatic ketones (a) include the compounds each having a benzophenone or thioxanthone skeleton described, for example in "Radiation Curing in Polymer Science and Technology" J. P. Fouassier and J. F. Rabek (1993), pp. 77 to 117, the disclosure of which is incorporated herein by reference. More preferable examples of the aromatic ketones (a) include the α-thio benzophenone compounds described in Japanese Patent Application Publication (JP-B) No. 47-6416 (the disclosure of which is incorporated herein by reference); the benzoin ether compounds described in JP-B No. 47-3981 (the disclosure of which is incorporated herein by reference); the α-substituted benzoin compounds described in JP-B No. 47-22326 (the disclosure of which is incorporated herein by reference); the benzoin derivatives described in JP-B No. 47-23664 (the disclosure of which is incorporated herein by reference); the aroyl phosphonic acid esters described in Japanese Patent Application Laid-Open (JP-A) No. 57-30704 (the disclosure of which is incorporated herein by reference); the dialkoxybenzophenones described in JP-B No. 60-26483 (the disclosure of which is incorporated herein by reference); the benzoin ethers described in JP-B No. 60-26403 and JP-A No. 62-81345 (the disclosures of which are incorporated herein by reference); the α-amino benzophenones described in JP-B No. 1-34242, U.S. Pat. No. 4,318, 791, and EP Patent No. 0284561A1 (the disclosures of which are incorporated herein by reference); p-di(dimethylaminobenzoyl)benzene described in JP-A No. 2-211452 (the disclosure of which is incorporated herein by reference); the thio-substituted aromatic ketones described in JP-A No. 61-194062 (the disclosure of which is incorporated herein by reference); the acylphosphine sulfides described in JP-B No. 2-9597 (the disclosure of which is incorporated herein by reference); the acylphosphines described in JP-B No. 2-9596 (the disclosure of which is incorporated herein by reference); the thioxanthones described in JP-B No. 63-61950 (the disclosure of which is incorporated herein by reference); and the coumarins described in JP-B No. 59-42864 (the disclosure of which is incorporated herein by reference).

Examples of the aromatic onium salt compounds (b) include aromatic onium salts of the elements in Groups V, VI and VII in the periodic table, specifically, aromatic onium salts of N, P, As, Sb, Bi, O, S, Se, Te, and I. Preferable examples thereof include the iodonium salts described in EP Patent No. 104143, U.S. Pat. No. 4,837,124, and JP-A Nos. 2-150848 and 2-96514 (the disclosures of which are incorporated herein by reference); the sulfonium salts described in EP Patent Nos. 370693, 233567, 297443, 297442, 279210, and 422570 and U.S. Pat. Nos. 3,902,144, 4,933,377, 4,760, 013, 4,734,444, and 2,833,827 (the disclosures of which are incorporated herein by reference); diazonium salts (e.g., benzene diazonium salts which may have one or more substituted groups); diazonium salt resins (e.g., formaldehyde resins of diazodiphenylamine); N-alkoxypyridinium salts (e.g., those described in U.S. Pat. No. 4,743,528, JP-A Nos. 63-138345, 63-142345, and 63-142346, and JP-B No. 46-42363 (the disclosures of which are incorporated herein by reference), and specifically, 1-methoxy-4-phenylpyridinium tetrafluoroborate, etc.); and the compounds described in JP-B Nos. 52-147277, 52-14278, and 52-14279 (the disclosures of which are incorporated herein by reference). The aromatic onium salt compound (b) generates a radical or an acid as an active species.

Examples of the organic peroxides (c) include almost all organic compounds having one or more oxygen-oxygen bonds in the molecule; and preferable examples thereof include peroxide esters such as 3,3',4,4'-tetra-(t-butylperoxycarbonyl)benzophenone, 3,3',4,4'-tetra-(t-amylperoxycarbonyl)benzophenone, 3,3',4,4'-tetra-(t-hexylperoxycarbonyl)benzophenone, 3,3',4,4'-tetra-(t-octylperoxycarbonyl)benzophenone, 3,3',4,4'-tetra-(cumylperoxycarbonyl)benzophenone, 3,3',4,4'-tetra-(p-isopropyl cumylperoxycarbonyl)benzophenone, and di-t-butyl diperoxyisophthalate.

Examples of the hexaarylbiimidazole compounds (d) include the Rofin dimers described in JP-B Nos. 45-37377 and 44-86516, such as 2,2'-bis(o-chlorophenyl)-4,4', 5,5'-tetraphenylbiimidazole, 2,2'-bis(o-bromphenyl)-4,4',5,5'-tetraphenylbiimidazole, 2,2'-bis(o-, p-dichlorophenyl)-4,4',5, 5'-tetraphenylbiimidazole, 2,2'-bis(o-chlorophenyl)-4,4',5, 5'-tetra(m-methoxyphenyl)biimidazole, 2,2'-bis(o-, o'-dichlorophenyl)-4,4', 5,5'-tetraphenylbiimidazole, 2,2'-bis (o-nitrophenyl)-4,4',5,5'-tetraphenylbiimidazole, 2,2'-bis(o-methylphenyl)-4,4',5,5'-tetraphenylbiimidazole, and 2,2'-bis (o-trifluorophenyl)-4,4',5,5'-tetraphenylbiimidazole.

Examples of the ketoxime ester compounds (e) include 3-benzoyloxyiminobutan-2-one, 3-acetoxyiminobutan-2-one, 3-propionyloxyiminobutan-2-one, 2-acetoxyiminopentane-3-one, 2-acetoxyimino-1-phenylpropan-1-one, 2-benzoyloxyimino-1-phenylpropan-1-one, 3-p-toluenesulfonyloxyiminobutan-2-one, and 2-ethoxycarbonyloxyimino-1-phenylpropan-1-one.

Examples of the borate compounds (f) as examples of other photopolymerizable initiator of the invention include the compounds described in U.S. Pat. Nos. 3,567,453 and 4,343, 891, and EP Patent No. 109,772 and 109,773 (the disclosures of which are incorporated herein by reference).

Examples of the azinium salt compounds (g) as examples of other photopolymerizable initiator of the invention include the compounds containing an N—O bond described in JP-A Nos. 63-138345, 63-142345, 63-142346, and 63-143537, and JP-B No. 46-42363, the disclosures of which are incorporated herein by reference.

Examples of the metallocene compounds (h) as examples of other photopolymerizable initiator of the invention include the titanocene compounds described in JP-A Nos. 59-152396, 61-151197, 63-41484, 2-249, and 2-4705 (the disclosures of which are incorporated herein by reference) and the iron-allene complexes described in JP-A Nos. 1-304453 and 1-152109 (the disclosures of which are incorporated herein by reference).

Specific examples of the titanocene compounds include di-cyclopentadienyl-Ti-dichloride, dicyclopentadienyl-Ti-bisphenyl, di-cyclopentadienyl-Ti-bis-2,3,4,5,6-pentafluorophen-1-yl, di-cyclopentadienyl-Ti-bis-2,3,5,6-tetrafluorophen-1-yl, di-cyclopentadienyl-Ti-bis-2,4,6-trifluorophen-1-yl, di-cyclopentadienyl-Ti-2,6-difluorophen-1-yl, di-cyclopentadienyl-Ti-bis-2,4-difluorophen-yl, di-methylcyclopentadienyl-Ti-bis-2,3,4,5,6-pentafluorophen-1-yl, di-methylcyclopentadienyl-Ti-bis-2,3,5,6-tetrafluorophen-1-yl, di-methylcyclopentadienyl-Ti-bis-2,4-difluorophen-1-yl, bis(cyclopentadienyl)-bis(2,6-difluoro-3-(pyr-1-yl)phenyl)titanium, bis(cyclopentadienyl) bis[2,6-difluoro-3-(methyl sulfonamide)phenyl]titanium, and bis (cyclopentadienyl) bis[2,6-difluoro-3-(n-butylbiaroyl-amino)phenyl]titanium.

Examples of the active ester compounds (i) include the nitrobenzylester compounds described in EP Patent Nos. 0290750, 046083, 156153, 271851, and 0388343, U.S. Pat. Nos. 3,901,710 and 4,181,531, and JP-A Nos. 60-198538 and 53-133022 (the disclosures of which are incorporated herein by reference); the iminosulfonate compounds described in EP Patent Nos. 0199672, 84515, 199672, 044115, and 0101122, U.S. Pat. Nos. 4,618,564, 4,371,605 and 4,431,774, and JP-A Nos. 64-18143, 2-245756, and 4-365048 (the disclosures of which are incorporated herein by reference); and the compounds described in JP-B Nos. 62-6223 and 63-14340, and JP-A No. 59-174831 (the disclosure of which is incorporated herein by reference).

Preferable examples of the compounds (j) containing carbon-halogen bonds include the compounds described in Wakabayashi et al., Bull. Chem. Soc, Japan, 42, 2924 (1969) (the disclosure of which is incorporated herein by reference); the compounds described in British Patent 1388492 (the disclosure of which is incorporated herein by reference); the compounds described in JP-A No. 53-133428 (the disclosure of which is incorporated herein by reference); and the compounds described in German Patent 3337024 (the disclosure of which is incorporated herein by reference).

Further examples include the compounds described in F. C. Schaefer et al., J. Org. Chem. 29, 1527 (1964) (the disclosure of which is incorporated herein by reference); the compounds described in JP-A No. 62-58241 (the disclosure of which is incorporated herein by reference); the compounds described in JP-A No. 5-281728 (the disclosure of which is incorporated herein by reference); as well as the compounds described in German Patent No. 2641100 (the disclosure of which is incorporated herein by reference); the compounds described in German Patent No. 3333450 (the disclosure of which is incorporated herein by reference); the compounds described in German Patent No. 3021590 (the disclosure of which is incorporated herein by reference); and the compounds described in German Patent No. 3021599 (the disclosure of which is incorporated herein by reference).

Preferable specific examples of the compounds represented by (a) to (j) are shown below:

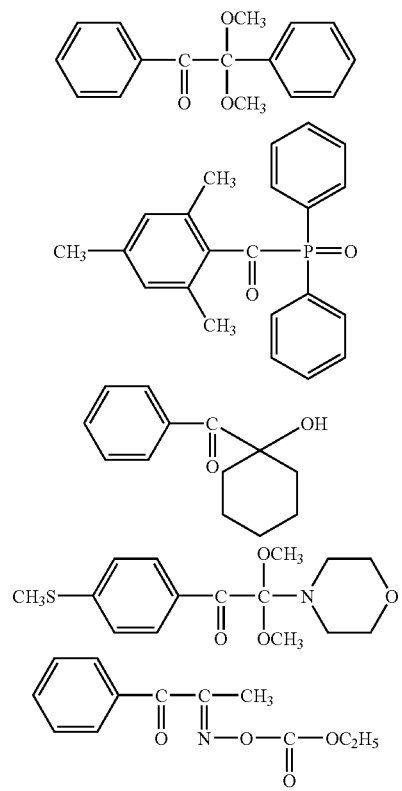

25
-continued
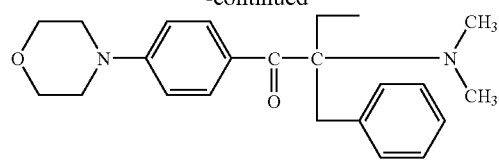
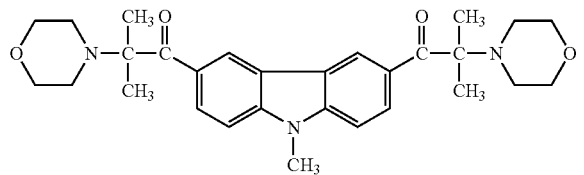
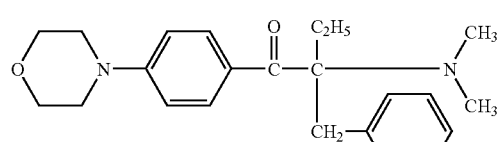
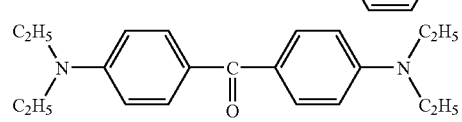
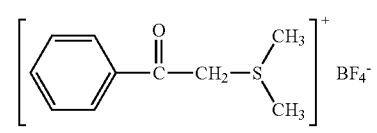
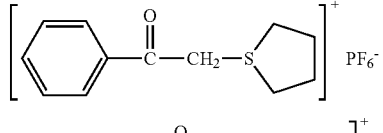
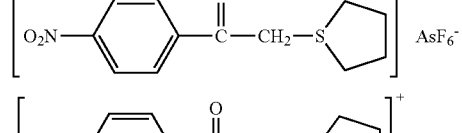
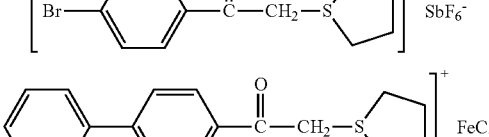
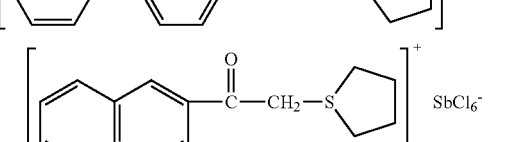
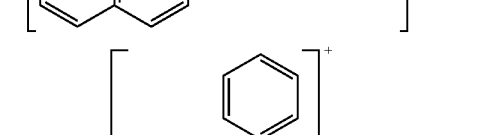
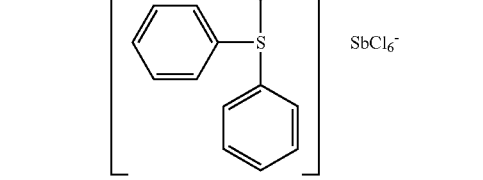
26
-continued
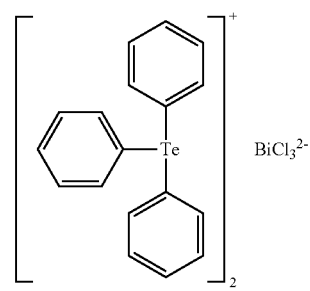
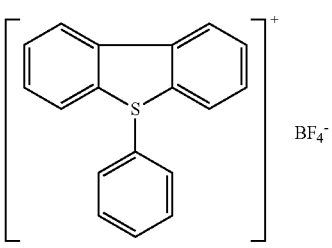
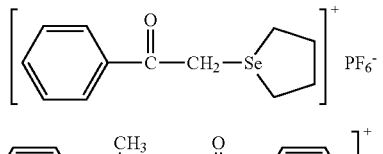
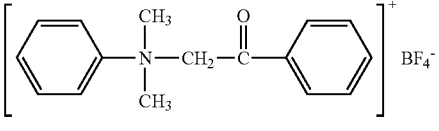
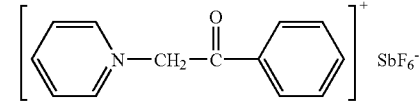
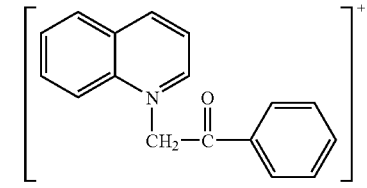
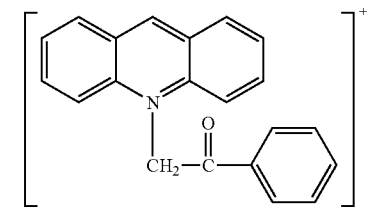
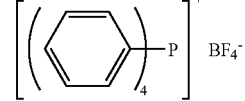
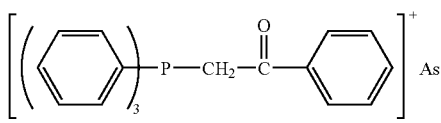
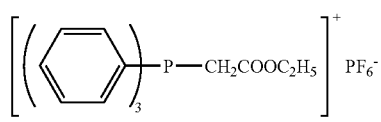

27
-continued
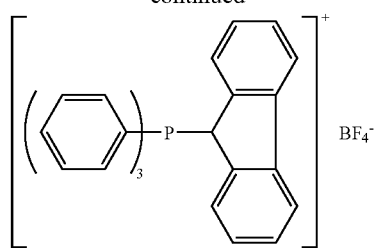
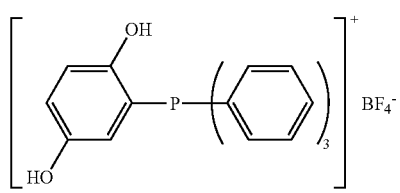
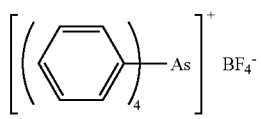
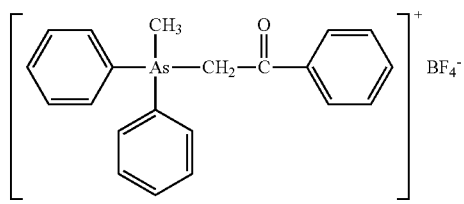
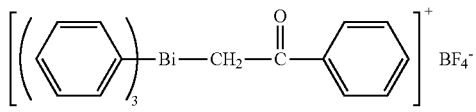
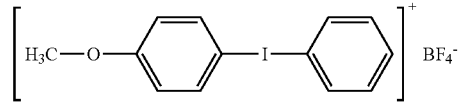
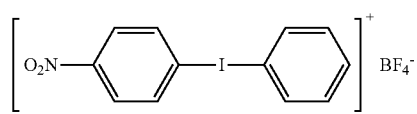
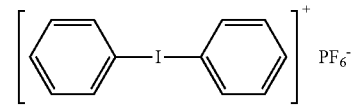
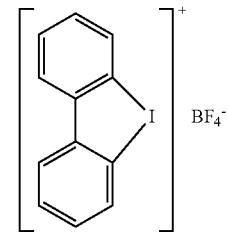
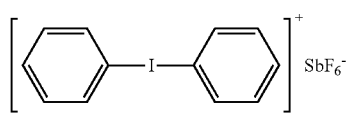
28
-continued
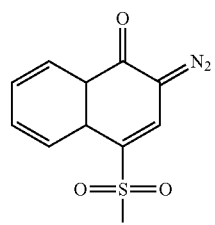
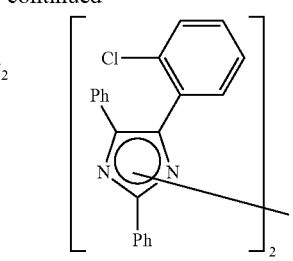
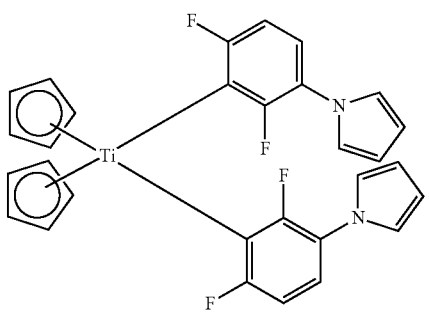
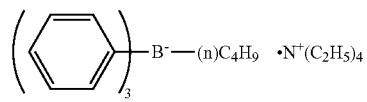
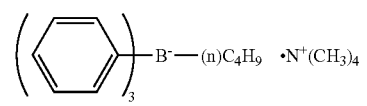
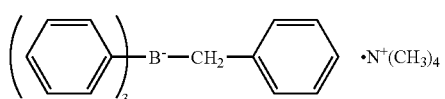
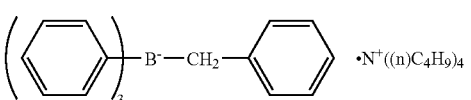
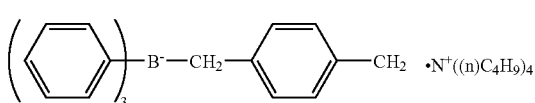
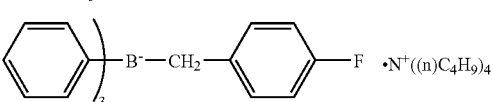
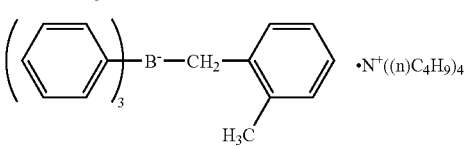
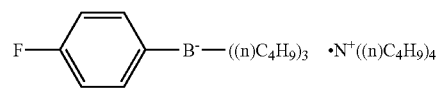
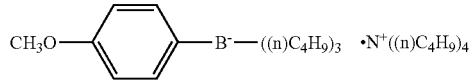
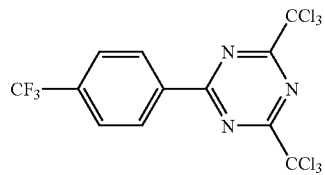

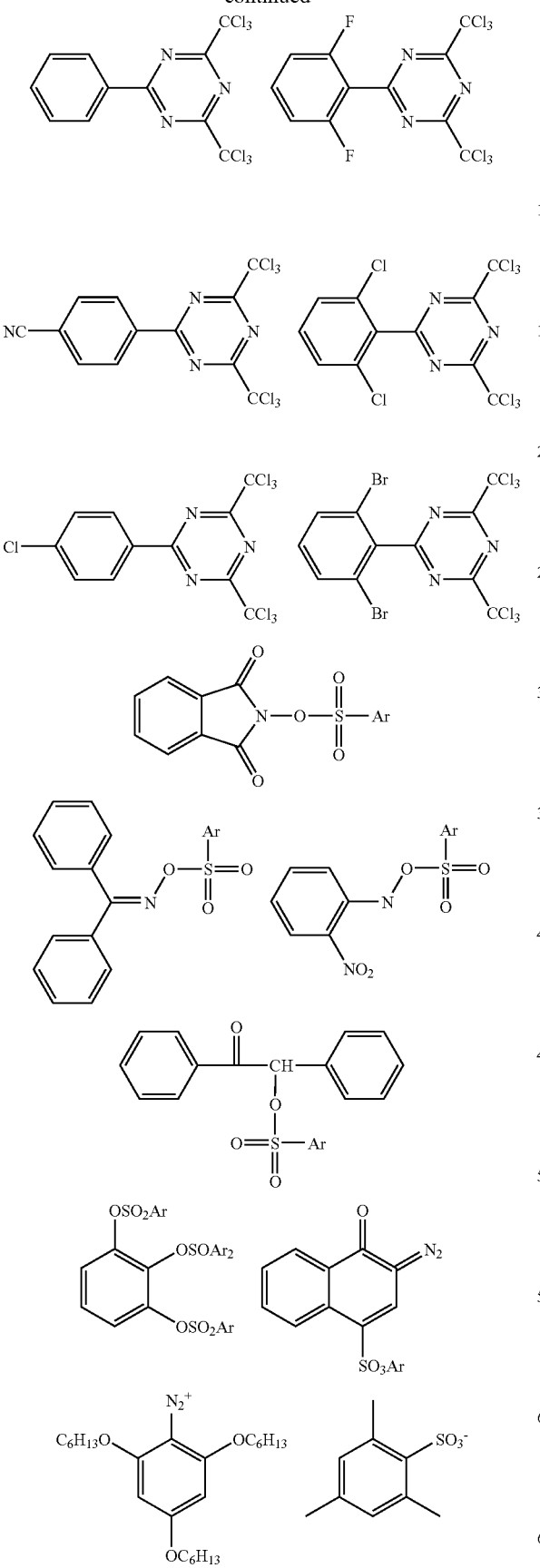
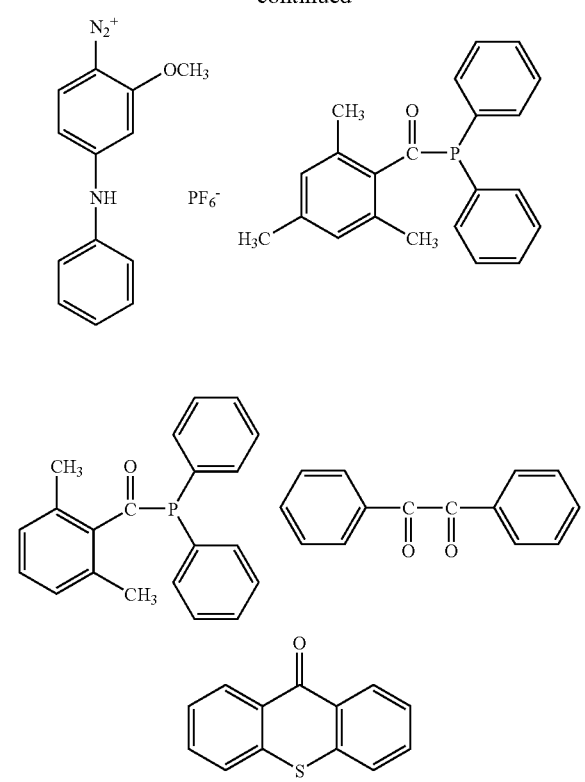

Only one photopolymerization initiator (d) may be used, or two or more photopolymerization initiators (d) may be used in combination. The content of the photopolymerization initiator (d) in the ink composition is preferably 0.1 to 20 wt %, more preferably 0.5 to 10 wt %, still more preferably 1 to 7 wt %, based on the total solid content in the ink composition.

Sensitizing Dye

In the invention, a sensitizing dye may be added for the purpose of improving the sensitivity of the photopolymerization initiator. Preferable examples of the sensitizing dye include those belonging to the following compound classes and having absorption wavelengths in the range of 350 to 450 nm: multinuclear aromatics (e.g., pyrene, perylene, and triphenylene), xanthenes (e.g., fluorescein, eosin, erythrosine, rhodamine B, and Rose Bengal), cyanines (e.g., thiacarbocyanine and oxacarbocyanine), merocyanines (e.g., merocyanine and carbomerocyanine), thiazines (e.g., thionine, methylene blue, and toluidine blue), acridines (e.g., acridine orange, chloroflavin, and acryflavin), anthraquinones (e.g., anthraquinone), squaliums (e.g., squalium), coumarins (e.g., 7-diethylamino-4-methyl coumarin).

More preferable examples of the sensitizing dye include compounds represented by the following formulae (IX) to (XIII):

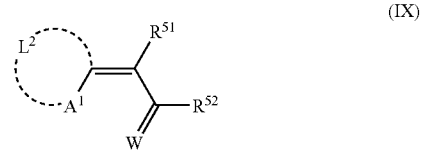

(IX)

-continued

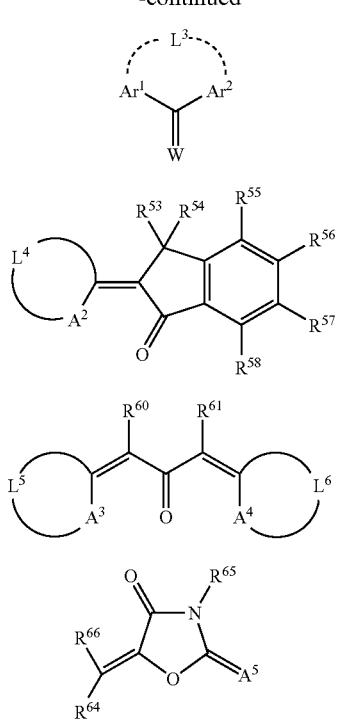

In formula (IX), $A^1$ represents a sulfur atom or $NR^{50}$, $R^{50}$ represents an alkyl group or an aryl group, $L^2$ represents a nonmetallic atomic group which, together with $A^1$ and the carbon atom adjacent thereto, forms a basic nucleus of a dye, $R^{51}$ and $R^{52}$ each independently represent a hydrogen atom or a monovalent nonmetallic atomic group, $R^{51}$ and $R^{52}$ may be bound to each other to form an acidic nucleus of a dye, and W represents an oxygen atom or a sulfur atom.

In formula (X), $Ar^1$ and $Ar^2$ each independently represent an aryl group, and are bound to each other via a linkage $-L^3-$ which represents —O— or —S—. W has the same definition as in formula (IX).

In formula (XI), $A^2$ represents a sulfur atom or $NR^{59}$, $L^4$ represents a nonmetallic atomic group which, together with $A^2$ and the carbon atom adjacent thereto, forms a basic nucleus of a dye, $R^{53}$, $R^{54}$, $R^{55}$, $R^{56}$, $R^{57}$ and $R^{58}$ each independently represent a monovalent nonmetallic atomic group, and $R^{59}$ represents an alkyl group or an aryl group.

In formula (XII), $A^3$ and $A^4$ each independently represent —S— or —$NR^{62}$— or —$NR^{63}$—. $R^{62}$ and $R^{63}$ each independently represent a substituted or unsubstituted alkyl group or a substituted or unsubstituted aryl group. $L^5$ represent a nonmetallic atomic group which, together with $A^3$ and the carbon atom adjacent thereto, forms a basic nucleus of a dye. $L^6$ represent a nonmetallic atomic group which, together with $A^4$ and the carbon atom adjacent thereto, forms a basic nucleus of a dye. $R^{60}$ and $R^{61}$ each independently represent a hydrogen atom or a monovalent nonmetallic atomic group, or $R^{60}$ and $R^{61}$ are bound to each other to form an aliphatic or aromatic cycle.

In formula (XIII), $R^{66}$ represents an optionally substituted aromatic cycle or heterocycle, $A^5$ represents an oxygen atom, a sulfur atom, or —$NR^{67}$—. $R^{64}$, $R^{65}$, and $R^{67}$ each independently represent a hydrogen atom or a monovalent nonmetallic atomic group. $R^{67}$ and $R^{64}$ may be bonded to each other to form an aliphatic or aromatic ring. $R^{65}$ and $R^{67}$ may be bonded to each other to form an aliphatic or aromatic cycle.

Preferable examples of the compounds represented by formulae (IX) to (XIII) include exemplary compounds (A-1) to (A-20) shown below:

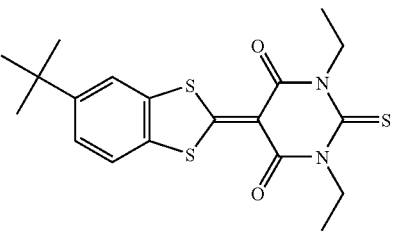
(A-1)

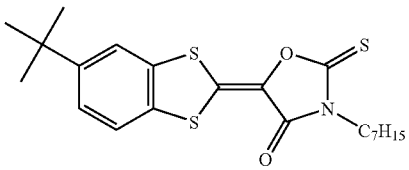
(A-2)

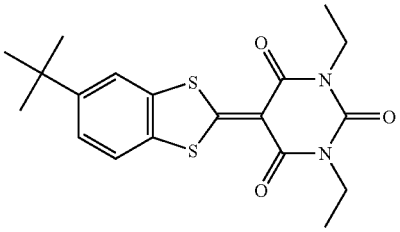
(A-3)

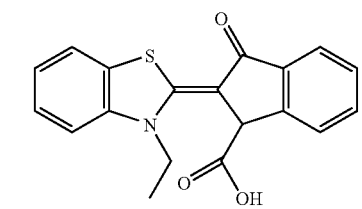
(A-4)

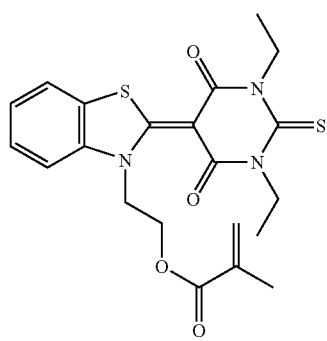
(A-5)

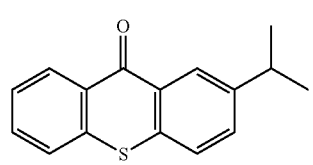
(A-6)

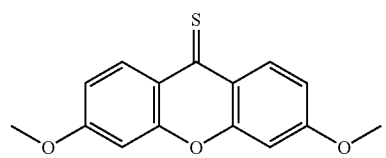
(A-7)

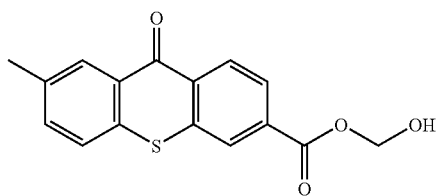
(A-8)

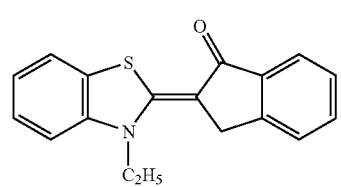
(A-9)

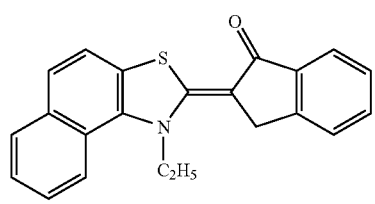
(A-10)

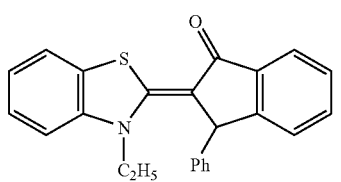
(A-11)

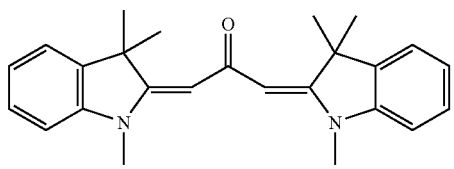
(A-12)

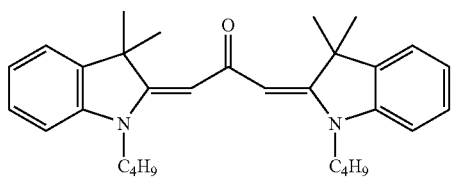
(A-13)

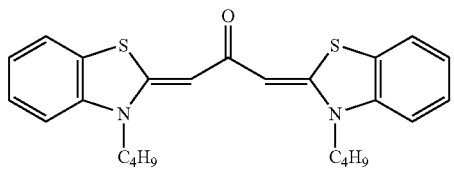
(A-14)

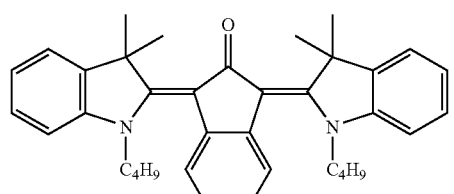
(A-15)

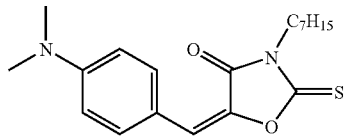
(A-16)

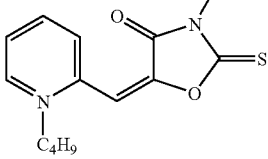
(A-17)

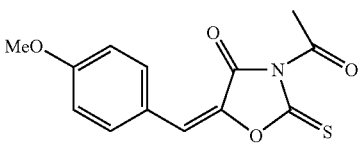
(A-18)

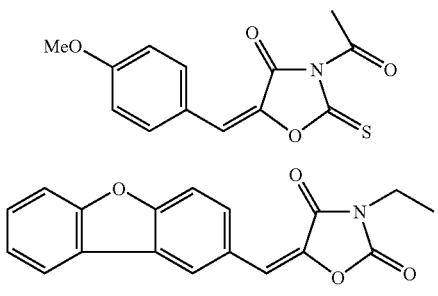
(A-19)

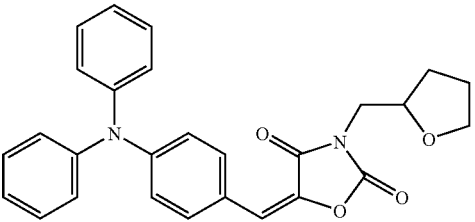
(A-20)

<Cosensitizer>

To the ink composition of the invention, a known compound that has a function of further improving the sensitivity or suppressing the inhibition of polymerization by oxygen may be added as a cosensitizer.

Examples of the cosensitizer include the amines described, for example, in M. R, Sander et al., "Journal of Polymer Society" 10, p. 3173, (1972), JP-B No. 44-20189, JP-A Nos. 51-82102, 52-134692, 59-138205, 60-84305, 62-18537, and 64-33104 and Research Disclosure 33825 (the disclosures of which are incorporated herein by reference); and specific examples thereof include triethanolamine, ethyl p-dimethylaminobenzoate, p-formyldimethylaniline, and p-methylthiodimethylaniline.

Other examples of the cosensitizer include thiols and sulfides, for example, the thiol compounds described in JP-A No. 53-702, JP-B No. 55-500806, and JP-A No. 5-142772 (the disclosures of which are incorporated herein by reference), and the disulfide compounds described in JP-A No. 56-75643 (the disclosure of which is incorporated herein by reference); and specific examples thereof include 2-mercaptobenzothiazole, 2-mercaptobenzoxazole, 2-mercaptobenzimidazole, 2-mercapto-4(3H)-quinazoline, and β-mercaptonaphthalene.

Yet other examples of the cosensitizer include amino acid compounds (e.g., N-phenylglycine), the organic metal compounds described in JP-B No. 48-42965 (e.g., tributyltin acetate), the hydrogen donors described in JP-B No. 55-34414, the sulfur compounds described in JP-A No.

6-308727 (e.g., trithiane), the phosphorus compounds described in JP-A No. 6-250387 (e.g., diethyl phosphite), and the Si—H and Ge—H compounds described in JP-A No. 8-65779.

In addition to the essential components (a) to (c), preferable optional component (d), and the sensitizing dye and cosensitizer that can be used together with the component (d), the ink composition according to the invention may further contain various additives in accordance with the purposes. For example, an ultraviolet absorbent may be added to the ink composition according to the invention, for the improvement in the weather fastness of the obtained image and prevention of the discoloration of the image. An antioxidant may be used to improve the stability of the ink composition.

Other usable additives include: an organic or metal-complex-based anti-fading agent; a conductive salt for the control of the ejection properties, such as potassium thiocyanate, lithium nitrate, ammonium thiocyanate, or dimethylamine hydrochloride salt; and a trace amount of an organic solvent for the improvement of the adhesion to the recording medium.

The ink composition according to the invention may further contain a polymer compound selected from various polymer compounds for the purpose of the adjustment of the film physical properties. Examples of polymer compounds include acrylic polymers, polyvinylbutyral resins, polyurethane resins, polyamide resins, polyester resins, epoxy resins, phenol resins, polycarbonate resins; polyvinylbutyral resins, polyvinylformal resins, shellac, vinyl resins, acrylic resins, rubber resin, waxes, and other natural resins. In an embodiment, two or more polymer compounds may be used simultaneously.

One or more substances selected from nonionic surfactants, cationic surfactants, and organic fluorocompounds may be added to control the liquid properties.

Other examples of usable additives, which may be added as necessary, include leveling additives, matting agents, waxes for controlling the film properties, and tackifiers, which do not inhibit polymerization, for improving the adhesion to recording media such as polyolefin and PET.

The ink composition of the invention has a viscosity of preferably 30 mPa·s or less and more preferably 5 to 20 mPa·s at the temperature of injection taking injection ability into account. It is preferable to control and determine the ratio of the composition properly such that the viscosity of the ink composition falls in the above range. The temperature at which the ink composition is injected is generally 25 to 90° C., preferably 25 to 80° C. and particularly preferably 40 to 80° C.

It is to be noted that the viscosity of the ink at 25 to 30° C. is 200 mPa·s or less and preferably 7 to 100 mPa s. By setting the viscosity high at room temperature, even if a porous recording medium is used, it is possible to prevent permeation of ink into the recording medium, reduce the amount of an uncured monomer, and decrease odors, and further, blurring of dots when ink droplets are impacted can be suppressed, resulting in improved image quality. When the viscosity of the ink at 25 to 30° C. is higher than 200 mPa·s, a problem arises concerning the delivery of the ink liquid.

The surface tension of the ink composition according to the invention is preferably 20 to 30 mN/m and more preferably 23 to 28 mN/m. When the ink is used for recording on various recording media such as polyolefin, PET, coated paper, and non-coated paper, the surface tension is preferably 20 mN/m or more in view of the prevention of bleeding and penetration, and 30 mN/m or less in view of the wettability.

The ink composition prepared in this manner is preferably used as inkjet recording ink. Specifically, the ink composition is used in an image forming method in which the ink composition of the invention is jetted to record an image on an inkjet recording medium and then, the recorded image is preferably irradiated with an active energy ray to cure.

In the printed articles obtained by the ink composition of the invention, the image portion has been cured by irradiation with an active energy ray such as ultraviolet rays and the printed articles are therefore superior in the strength of the image portion. Therefore, the ink composition of the invention may be used in various applications such as the formation of the ink receptor layer (image portion) of a planographic printing plate, besides image formation using ink.

The amount of the above an active energy ray to be applied is preferably 20 to 2000 mJ/cm$^2$.

Inkjet Recording Method and Inkjet Recording Apparatus

Next, an inkjet recording method and an inkjet recording apparatus, which are preferably adopted in the image forming method, will be explained.

In the inkjet recording method, it is preferable to eject the ink composition after the viscosity of ink composition is lowered to 30 mPa·s or less by heating to 40 to 80° C., and in this manner, it is possible to realize highly stable ejection. Generally, activated energy radiation-curable ink compositions are usually more viscous than aqueous inks, and the fluctuation in the viscosity of activated energy radiation-curable ink compositions caused by the fluctuation in temperature during printing is larger. The fluctuation in the viscosity of ink composition exerts significant influences on the droplet size and the droplet ejection speed, causing deterioration in image quality, and thus, it is necessary to keep the temperature of the ink composition as constant as possible during printing. It is preferable to control the ink composition temperature within ±5° C. from the set temperature, more preferably ±2° C. from the set temperature, and still more preferably ±1° C. from the set temperature.

The inkjet recording apparatus may have an ink-temperature stabilizing device. The ink-temperature stabilizing device maintains a constant temperature of the ink composition in all the piping systems and members from the ink tank (from the intermediate tank if such an intermediate tank is present) to the ejection face on the nozzles The method of controlling the temperature is not particularly limited, and may be, for example, a method in which heating conditions are controlled according to the flow rate of the ink composition and the environmental temperature based on the information supplied from plural temperature sensors provided to the respective pipes. The heat unit to be heated is preferably insulated thermally such that the unit is not affected by the environmental temperature. In a preferable embodiment, the heat unit is thermally insulated from the other portions, and the total heat capacity of the heating unit is small, whereby the printer starting-up time required for heating is shortened and the heat energy loss is reduced.

An activated energy-radiation-curable ink composition can be obtained by adding the photopolymerization initiator (d) to the ink composition of the invention.

Conditions of the irradiation of the ink with active energy rays will be described below. A basic method of the irradiation with activated radiation rays is disclosed in JP-A No. 60-132767, the disclosure of which is incorporated herein by reference. Specifically, light sources are disposed at both side of a head unit that ejects the ink composition, and the ink composition is ejected while the head unit and the light sources are scanned in the shuttle mode. The ink composition is irradiated with the activated radiation rays after a predetermined period from the deposition of the ink composition on the recording medium. In an embodiment, the ink composition is cured using another light source that is not driven. Specifically, WO 99/54415 (the disclosure of which is incorporated herein by reference) discloses an irradiation method comprising using an optical fiber and an irradiation method comprising irradiating the recording area (region having the ink composition deposited thereon) with UV rays by directing a collimated rays to a mirror surface on the sidewall of head unit. These irradiation methods may be used in the invention.

Further, in the inkjet recording method according to the invention, it is preferable to heat the ink composition to a predetermined temperature and adjust the period between the deposition of the ink composition on the recording medium and the irradiation with active energy rays to 0.01 to 0.5 second, preferably 0.01 to 0.3 second, and more preferably 0.01 to 0.15 second. It becomes possible to prevent bleeding of the deposited ink composition before curing, by shortening the period between the deposition of the ink composition on the recording medium and the irradiation of activated radiation rays to such an extremely short period. Further, since the ink composition is irradiated before penetrating deep into the recording medium even when the recording medium is porous, the ink composition is surely irradiated, whereby the amount of the remaining unreacted monomer is reduced and consequently the odor is also reduced. The combination of the above-described inkjet recording method and the ink composition of the invention provides a significant synergy effects. In particular when the viscosity of the ink composition at 25° C. is 200 mPa·s or less, the advantageous effects of the invention are remarkable. By employing such a recording method, it is possible to maintain the dot diameter of the deposited ink composition constant and obtain an image with improved quality, on any of various recording media different in surface wettability. In order to obtain a color image, it is preferable to form images in the order from a color lower in lightness. When an ink of lower lightness is deposited, the activated radiation rays are unlikely to reach the inks located at the bottom; therefore, curing sensitivity and improvement in adhesiveness are likely to be deteriorated, and the residual monomer is likely to increased to cause odor. Although it is possible conduct the irradiation with activated rays after a full-color image is formed, it is preferable to irradiate the image with activated rays after each color ink is deposited, in view of the acceleration of curing.

The inkjet recording apparatus used in the invention is not particularly limited, and a commercial inkjet recording apparatus can be used. In other words, the recording on a recording medium can be conducted by a commercial inkjet recording apparatus.

In the preferable ejecting conditions described above, although the ink composition of the invention is repeatedly heated and cooled, reduction in colorant dispersibility is avoided, excellent coloring property is achieved over a long period, and the deterioration of the ejection property caused by the aggregation of the colorant is also avoided owing to the function of the specific polymer (b) even when the ink composition is stored under such temperature conditions.

(Recording Medium)

The recording medium to which the ink composition according to the invention is applicable is not particularly limited, and examples thereof include ordinary papers such as non-coated paper and coated paper, various non-absorptive resin materials for use in so-called soft packaging, and resin films thereof in the film shape. Examples of such various plastic films include PET film, OPS film, OPP film, ONy film, PVC film, PE film, and TAC film. Examples of other plastics usable as the material of the recording medium include polycarbonate, acrylic resins, ABS, polyacetal, PVA, and rubbers. In addition, metals and glasses are also usable as the recording media.

The ink composition of the invention is used to print on a recording medium by an inkjet printer and then, preferably, the ink composition applied by printing is irradiated with an active energy ray and cured, whereby the printed article of the invention can be obtained. The printed article of the invention has a high quality image superior in color developing ability and sharpness and is also superior in the fastness of the image because the ink used for formation of an image contains a colorant, particularly, fine pigment particles uniformly and stably in a dispersed state. The ink composition of the invention is therefore applied in a wide range of fields.

Exemplary aspects according to the invention will be given hereinbelow.

<1> An ink composition comprising at least a colorant (a) and (b) a polymer (b) having a heterocyclic moiety forming a colorant.

<2> The ink composition according to the above <1>, the composition further comprising a polymerizable compound (c).

<3> The ink composition according to the above <1> or <2>, wherein the average particle diameter of the colorant (a) is 0.01 to 0.4 μm.

<4> The ink composition according to the above <1>, wherein the colorant (a) is a pigment.

<5> The ink composition according to any one of the above <1> to <4>, wherein the above polymer (b) is a polymer containing a repeating unit represented by the following formula (1).

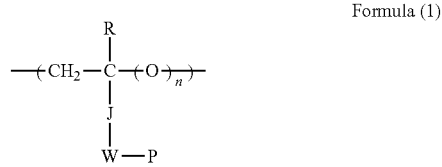

Formula (1)

In the formula (1), R represents a hydrogen atom or a methyl group. J represents —CO—, —COO—, —CONR$^1$—, —OCO—, a methylene group or a phenylene group, wherein R$^1$ represents a hydrogen atom, an alkyl group or an aryl group. n denotes 0 or 1. W represents a single bond or a divalent connecting group. P represents a heterocyclic moiety forming a colorant.

<6> The ink composition according to any one of the above <1> to <5>, wherein P in the above formula (1) includes at least any one selected from quinacridone, benzimidazolone, indole, quinoline, carbazole, acridine, acridone and anthraquinone.

<7> The ink composition according to any one of the above <1> to <6>, wherein the above polymer (b) is a graft copolymer containing, as a copolymer unit, a polymerizable oligomer (macro-monomer) having an ethylenically unsaturated double bond at its terminal.

<8> The ink composition according to the above <7>, wherein the polymerizable oligomer is an oligomer represented by the following formula (2).

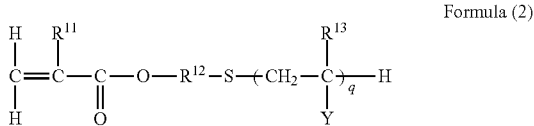

Formula (2)

In the formula (2), $R^{11}$ and $R^{13}$ each independently represent a hydrogen atom or a methyl group.

$R^{12}$ represents an alkylene group having 1 to 12 carbon atoms (preferably an alkylene group having 2 to 4 carbon atoms, may have a substituent (for example, a hydroxyl group) and may contain an ester bond, ether bond or amide bond in the alkylene chain).

Y represents a phenyl group or —COOR$^{14}$. The phenyl group may be substituted and examples of the substituent include an alkyl group (for example, methyl and ethyl) having 1 to 4 carbon atoms. $R^{14}$ represents an alkyl group having 1 to 10 carbon atoms (for example, methyl, ethyl or benzyl) or a phenyl group.

<9> The ink composition according to the above <7>, wherein the polymerizable oligomer is an oligomer represented by the following formula (3).

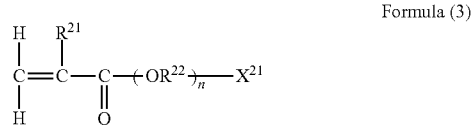

Formula (3)

In the above formula (3), $R^{21}$ represents a hydrogen atom or a methyl group and $R^{22}$ represents an alkylene group having 1 to 8 carbon atoms. $X^{21}$ represents —OR$^{23}$ or —OCOR$^{24}$. Wherein, $R^{23}$ and $R^{24}$ each independently represent a hydrogen atom, an alkyl group or an aryl group. n denotes a number from 2 to 200.

<10> The ink composition according to the above <7>, wherein the above polymer (b) is a copolymer with a monomer which further comprises a nitrogen atom-containing group.

<11> The ink composition according to the above <1>, wherein the above monomer having a nitrogen atom-containing group and an ethylenically unsaturated double bond is represented by the following formula (4).

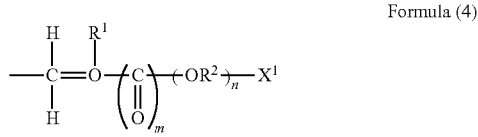

Formula (4)

In the above formula (4), $R^1$ represents a hydrogen atom or a methyl group, $R^2$ represents an alkylene group having 1 to 12 carbon atoms, $X^1$ represents —N(R$^3$)(R$^4$), —R$^5$—N(R$^6$)(R$^7$) or a basic heterocyclic group containing nitrogen. $R^3$, $R^4$, $R^6$ and $R^7$ each independently represent a hydrogen atom, an alkyl group having 1 to 18 carbon atoms or an aryl group having 6 to 18 carbon atoms and $R^5$ represents an alkylene group having 1 to 12 carbon atoms. m and n independently denote 1 or 0.

<12> The ink composition according to the above <1> to <11>, wherein two or more of the above polymer (b) are used in combination.

<13> The ink composition according to the above <2> to <12>, wherein a combination of at least one oxetane compound and at least one compound selected from an epoxy compound and a vinyl ether compound is used as the above polymerizable compound (c).

<14> The ink composition according to the above <1> to <13>, the ink composition further comprising a polymerization initiator (d).

<15> The ink composition according to the above <14>, wherein the above polymerizable compound (c) is a radically polymerizable compound and the above polymerization initiator (d) is a photo-radical generator.

<16> The ink composition according to the above <14>, wherein the above polymerizable compound (c) is a cationic polymerizable compound and the above polymerization initiator (d) is a photo-acid generator.

<17> An inkjet composition comprising the ink composition according to the above <1> to <16>.

<18> An image forming method comprising: applying an ink composition comprising at least a colorant (a) and a polymer (b) having a heterocyclic moiety forming a colorant, on a recording medium by printing and irradiating the applied ink composition with an active energy ray to cure the composition.

<19> A printed article obtained by curing an ink composition comprising at least a colorant (a) and a polymer (b) having a heterocyclic moiety forming a colorant.

<20> The printed article according to the above <19>, the printed article being obtained by applying the above ink composition to a recording medium by printing using an inkjet printer and then by irradiating the ink composition with an active energy ray to cure the ink composition.

EXAMPLES

The present invention will be explained in more detail by way of examples, which are not intended to limit the invention. In these examples, all designations of parts and % indicate parts by weight and weight percentage (wt.%), respectively, unless otherwise specified.

Synthetic Example 1

Synthesis of Specific Polymer (b)

(Synthesis of Monomer 1)

9.76 parts of 9(10H)-acridone and 5.61 parts of t-butoxypotassium were dissolved in 30 parts of dimethylsulfoxide and the mixture was heated to 45° C. 15.26 parts of chloromethylstyrene was added dropwise to the mixture, which was then heated at 50° C. with stirring for 5 hours. This reaction solution was poured into 200 parts of distilled water with stirring. The resulting precipitates were separated by filtration and washed to obtain 11.9 parts of a monomer.

(Synthesis of Polymer 1)

15 parts of methyl ethyl ketone was introduced into a three-neck flask in which the atmosphere was substituted with nitrogen, stirred with a stirrer (trade name: Three-one Motor, manufactured by Shinto Scientific Co., Ltd.) and heated to raise the temperature to 78° C. with nitrogen flowing in the flask. The following monomer solution and initiator solution which were separately prepared were added dropwise to the above solution over 2 hours at the same time. After the addition was completed, 0.08 parts of the following V-65 was further added to the mixture, which was heated at 78° C. for 3 hours with stirring. The resulting reaction solution was poured into 1000 parts of hexane with stirring to collect the produced precipitates by filtration, and the precipitates were heated and dried to obtain a graft polymer 1.

| (Monomer solution) | |
|---|---|
| Monomer 1 | 3.0 parts |
| Polymethylmethacrylate having a methacryloyl group at its terminal (trade name: AA-6, manufacture by Toagosei Co., Ltd., number average molecular weight: 6000) | 21.0 parts |
| 3-(N,N-dimethylaminopropylacrylamide) | 6.0 parts |
| Methyl ethyl ketone | 45 parts |

| (Initiator solution) | |
|---|---|
| 2,2-azobis(2,4-dimethylvaleronitrile) (trade name: V-65, manufactured by Wako Pure Chemical Industries, Ltd.) | 0.04 parts |
| Methyl ethyl ketone | 9.6 parts |

Synthetic Example 2

A graft polymer 2 was obtained in the same manner as in Synthetic Example 1 except that the polymethylmethacrylate having a methacryloyl group at its terminal, which was used in Synthetic Example 1, was changed to methoxypolyethylene glycol methacrylate (trade name: NK Ester M-23OG, manufactured by Shin-Nakamura Chemical Co., Ltd.).

Synthetic Example 3

Synthesis of Monomer 2

9.56 parts of N-(2-hydroxyethyl)phthalimide, 5.16 parts of triethylamine and 50 parts of ethyl acetate were dissolved, and the mixture was heated to 40° C. 7.76 parts of 2-methacryloyloxyethylisocyanate (trade name: Kalens MOI, manufactured by SHOWA DENKO K.K.) was gradually added dropwise to the mixture, and the mixture was further heated at 45° C. for 7 hours with stirring. The resulting reaction solution was extracted with ethyl acetate, followed by washing with water, washing with saturated saline, drying and concentrating, to obtain 15.1 parts of a monomer 2.

Synthesis of Polymer 3

A graft polymer 3 was obtained in the same manner as in Synthetic Example 1 except that the monomer 1 used in Synthetic Example 1 was changed to a monomer 2.

Example 1

In this example, the following components were used. Specifically, the specific polymer (b) was dissolved in the polymerizable compound (c) and the mixture was placed together with the pigment (a) in a Motor Mill M50 (manufactured by Eiger Co., Ltd.) to disperse the mixture at a peripheral speed of 9 m/s for 6 hours by using zirconia beads 0.65 mm in diameter, thereby obtaining an undiluted solution of active energy ray-curable ink. Then, the polymerization initiator (d) was added to the undiluted ink solution and both were mixed mildly. Then the mixture was filtered under pressure by using a membrane filter to obtain an active energy ray-curable type inkjet ink of Example 1.

| | | |
|---|---|---|
| (a) | Pigment (Quinacridone Base Pigment PR 122) | 5.0 parts |
| (b) | Specific polymer (graft polymer 1 obtained in Synthetic Example 1) | 1.5 parts |
| (c) | Polymerizable compound (hexanedioldiacrylate) (trade name: HDDA, manufactured by Daicel UCB Co., Ltd.) | 60.0 parts |
| (c) | Polymerizable compound (trade name: DPCA-60, manufactured by Nippon Kayaku Co., Ltd., caprolactone-modified dipentaerythritol hexaacrylate) | 27.5 parts |
| (d) | Polymerization initiator (trade name: Lucirin TPO-L, manufactured by BASF, acylphosphine oxide compound) | 5.0 parts |

Examples 2 and 3

Active energy ray-curable type inkjet inks of Examples 2 and 3 were obtained in the same manner as in Example 1 except that the graft polymer 1 which was the specific polymer (c) used in Example 1 was changed to the graft polymers 2 and 3 obtained in Synthetic Example 2 and 3 respectively.

Comparative Example 1

An active energy ray-curable type inkjet ink of Comparative Example 1 was obtained in the same manner as in Example 1 except that the graft polymer 1 which was the specific polymer (c) used in Example 1 was changed to a commercially available pigment dispersant (trade name: "SORSPERSE 24000GR", manufactured by Nippon Liverysol (k.k.).

Comparative Example 2

An active energy ray-curable type inkjet ink of Comparative Example 2 was obtained in the same manner as in Example 1 except that the graft polymer 1 which was the specific polymer (b) used in Example 1 was changed to a commercially available pigment dispersant (trade name: "SORSPERSE 32000", manufactured by Nippon Liverysol (k.k.).

Examples 4 to 6 and Comparative Examples 3 and 4

Inkjet ink compositions of Examples 4 to 6 and Comparative Examples 3 and 4 were obtained in the same manner as in Examples 1 to 3 and Comparative Examples 1 and 2, respectively, except that PY-128 was used in place of the pigment (a) (PR122) in Examples 1 to 3 and Comparative Examples 1 and 2.

Examples 7 to 9 and Comparative Examples 5 and 6

Inkjet inks of Examples 7 to 9 and Comparative Examples 5 and 6 were obtained in the same manner as in Examples 1 to 3 and Comparative Examples 1 and 2, respectively, except that the polymerizable compound (c) and the polymerization initiator (d) were changed to the following compounds in Examples 1 to 3 and Comparative Examples 1 and 2.

| | |
|---|---:|
| (c) Polymerizable compound: oxetane compound (trade name: OXT-221, manufactured by Toagosei Co., Ltd.) | 70.0 parts |
| (c) Polymerizable compound: epoxy compound (trade name: Celoxide 3000, manufactured by Daicel Chemical Industries, Ltd.) | 17.5 parts |
| (d) polymerization initiator: triphenylsulfonium salt (trade name: UVI-6992, manufactured by Dow Chemical) | 5.0 parts |

Examples 10 to 12 and Comparative Examples 7 and 8

Inkjet inks of Examples 10 to 12 and Comparative Examples 7 and 8 were obtained in the same manner as in Examples 7 to 9 and Comparative Examples 5 and 6, respectively, except that the pigment PR122 was changed to a phthalocyanine-baseed pigment PB15:3 in Examples 7 to 9 and Comparative Examples 5 and 6 respectively.

[Evaluation of the Ink Compositions]

The obtained inkjet inks were evaluated according to the following methods. The results are shown in Table 1.

(1. Viscosity)

The viscosity of each inkjet ink at 40° C. was measured by an E-type viscometer. A is a non-problematic level, B is a practically non-problematic level, and C is a practically problematic level with regard to jetting ability.

A: 30 mPa·s or less.
B: exceeding 30 mPa·s and less than 100 mPa·s.
C: 100 mPa·s or more.

(2. Stability)

The state of dispersion of each inkjet ink after being stored at 25° C. for one month and after being stored at 70° C. for 24 hours was evaluated visually and according to viscosity change.

A is a non-problematic level, B is a non-problematic level with regard to jetting ability, C is a practically problematic level because of low jetting ability, and D is a problematic level because jetting is not possible.

A: No precipitate is generated, and an increase in viscosity is not observed.
B: No precipitate is generated, and a slight increase in viscosity is observed.
C: No precipitate is generated, but an increase in viscosity is observed.
D: Precipitates are generated.

(3. Average Particle Diameter)

The volumetric average particle diameter D50 of each inkjet ink was measured using a light-scattering diffraction type grain distribution measuring device (trade name: LA910, manufactured by Horiba, Ltd.) to carry out evaluation. A is a non-problematic level, B is a practically non-problematic level, and C is a practically problematic level.

A: D50 is less than 100 nm.
B: D50 is 100 nm or more and less than 200 nm.
C: D50 is 200 nm or more.

(4. Curability)

The obtained ink compositions were applied to art paper by printing using an inkjet printer (printing density: 300 dpi, dotting frequency: 4 kHz, number of nozzles: 64) and then exposed to light by using a Deep UV lamp (trade name: SP-7, manufactured by Ushio Inc. under an energy condition of 100 mJ/cm$^2$ to obtain a print sample. A cured coating film was touched with the fingers to evaluate the presence of a sticky feel according to the following standard. A is a non-problematic level, B is a practically non-problematic level, and C is a practically problematic level.

A: No sticky feel.
B: Slightly sticky.
C: Very sticky.

(5. Heat Cycle Characteristics)

The obtained ink compositions were subjected to a temperature rise/drop cycle at temperatures between 25° C. and 60° C. which cycle was repeated 10 times. Then, the ink compositions were applied by printing using the above inkjet printer to observe whether a nozzle defect was present or not, to thereby evaluate the ink compositions according to the following standard. A is a non-problematic level, B is a practically non-problematic level, and C is a practically problematic level.

A: No nozzle defect was generated, and a high quality image was formed.
B: Satellites were partly generated, and image defects were observed.
C: Nozzle defects were generated, and significant image defects were observed.

TABLE 1

| | | Evaluation of the ink composition | | | | | |
|---|---|---|---|---|---|---|---|
| | Pigment dispersant | Viscosity | Stability (25° C.) | Stability (70° C.) | Particle diameter | Curability | Heat cycle characteristics |
| Example 1 | Polymer 1 | A | A | A | A | A | A |
| Example 2 | Polymer 2 | A | A | A | A | A | A |
| Example 3 | Polymer 3 | A | A | A | A | A | A |
| Comparative Example 1 | Commercially available dispersant 24000GR | A | C | C | A | A | B |
| Comparative Example 2 | Commercially available dispersant 32000 | A | A | C | A | A | B |
| Example 4 | Polymer 1 | A | A | A | A | A | A |
| Example 5 | Polymer 2 | A | A | A | A | A | A |
| Example 6 | Polymer 3 | A | A | A | A | A | A |
| Comparative Example 3 | Commercially available dispersant 24000GR | C | C | D | C | A | C |

TABLE 1-continued

| | Pigment dispersant | Evaluation of the ink composition |||||| 
| | | Viscosity | Stability (25° C.) | Stability (70° C.) | Particle diameter | Curability | Heat cycle characteristics |
|---|---|---|---|---|---|---|---|
| Comparative Example 4 | Commercially available dispersant 32000 | B | C | C | B | A | C |
| Example 7 | Polymer 1 | A | A | A | A | A | A |
| Example 8 | Polymer 2 | A | A | A | A | A | A |
| Example 9 | Polymer 3 | A | A | A | A | A | A |
| Comparative Example 5 | Commercially available dispersant 24000GR | A | C | C | B | A | B |
| Comparative Example 6 | Commercially available dispersant 32000 | A | B | C | B | A | B |
| Example 10 | Polymer 1 | A | A | A | A | A | A |
| Example 11 | Polymer 2 | A | A | A | A | A | A |
| Example 12 | Polymer 3 | A | A | A | A | A | A |
| Comparative Example 7 | Commercially available dispersant 24000GR | C | C | D | C | A | B |
| Comparative Example 8 | Commercially available dispersant 32000 | B | B | D | B | A | B |

As is clear from Table 1, the ink composition of the invention was cured with high sensitivity when irradiated with an active energy ray, and it could therefore form a non-sticky high quality image. Even in the case where it was stored for a long time or under the repeatedly varied temperature conditions, the dispersibility and dispersion stability of the colorant were both satisfactory without any increase in viscosity associated with a reduction in the dispersibility of the colorant.

On the other hand, although the comparative examples using commercially available high molecular dispersant had favorable pigment dispersibility initially, they were deteriorated in, particularly, storage under a high-temperature condition and heat-cycle characteristics showing that they had characteristics at a practically problematic level.

The invention, which has been made taking the above problems into account, can provide an ink composition preferable for inkjet recording which is superior in the dispersibility of fine colorants, especially pigments, and in the stability of the dispersion, enables the formation of a high quality image having a sharp color tone and high tinting strength, and can be cured by irradiation with an active energy ray, and an inkjet recording method using the ink composition.

Also, the invention can provide a printed article obtained using the above ink composition.

The present invention provides an ink composition is obtained which is superior in the dispersibility of a colorant and in the dispersion stability of a colorant as shown by the fact that a reduction in dispersion stability is efficiently prevented even after long-term storage or with the passage of time under repetition of varied temperature conditions by using a specified graft polymer as the colorant dispersant.

The ink composition of the invention can be used in usual printing to form a sharp image with excellent coloring property, thus giving a high-quality printed material. The ink composition of the invention can be advantageously used also in the production of resists, color filters, and optical disks, and is useful also as an optical molding material.

When the ink composition of the invention is applied to the inkjet recording method, a high-quality image can be formed even on a non-absorptive recording medium directly based on digital data, and the ink composition of the invention can thus be used advantageously for the production of a printed material having a large area.

All publications, patent applications, and technical standards mentioned in this specification are herein incorporated by reference to the same extent as if each individual publication, patent application, or technical standard was specifically and individually indicated to be incorporated by reference.

What is claimed is:

1. An ink composition comprising at least a colorant (a) and a polymer (b) which is a colorant dispersant and which contains a repeating unit represented by the following formula (1):

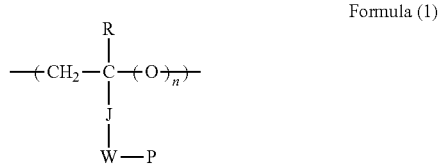

Formula (1)

wherein R represents a hydrogen atom or a methyl group; J represents —CO—, —COO—, —CONR$^1$—, —OCO—, a methylene group or a phenylene group; R$^1$ represents a hydrogen atom, an alkyl group or an aryl group; n denotes 0 or 1; W represents a single bond or a divalent connecting group; and P represents a heterocyclic moiety, wherein a hetero ring of the heterocyclic moiety is selected from the group consisting of benzimidazolone, quinoline, acridine, acridone, phthalimide, quinaldine and quinophthalone.

2. The ink composition according to claim 1, wherein the composition further comprises a polymerizable compound (c).

3. The ink composition according to claim 1, wherein the average particle diameter of the colorant (a) is 0.01 to 0.4 µm.

4. The ink composition according to claim 1, wherein the colorant (a) is a pigment.

5. The ink composition according to claim 1, wherein P in the formula (1) includes at least any one selected from benzimidazolone, quinoline, acridine and acridone.

6. The ink composition according to claim 1, wherein the polymer (b) is a graft copolymer containing, as a copolymer unit, a polymerizable oligomer having an ethylenically unsaturated double bond at its terminal.

7. The ink composition according to claim 1, wherein two or more of the polymer (b) are used in combination.

8. An inkjet composition comprising the ink composition of claim 1.

9. The ink composition according to claim 1, wherein the repeating unit represented by formula (1) is selected from the group consisting of repeating units represented by formulas M-1, M-3, M-4, M-13, M-14 and M-17:

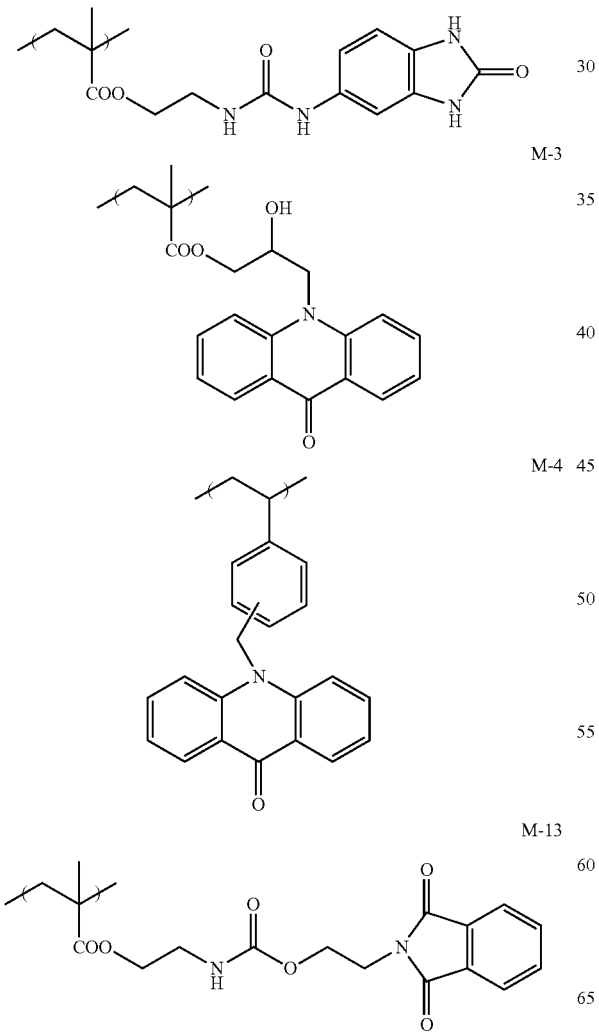

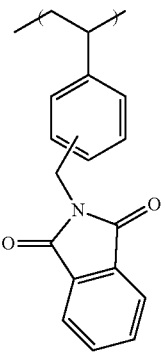

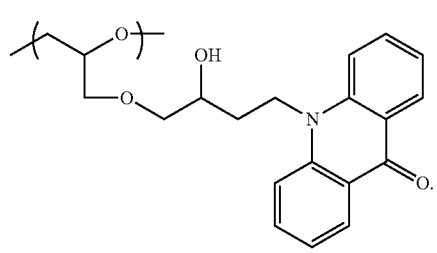

10. The ink composition according to claim 1, wherein J represents —CONR$^1$—, —OCO—, a methylene group or a phenylene group.

11. The ink composition according to claim 1, wherein the polymer (b) includes a repeating unit derived from a monomer selected from the group consisting of N,N-dimethylaminoethyl(meth)acrylate, N,N-dimethylaminopropyl(meth)acrylate, N,N-diethylaminoethyl(meth)acrylate, N,N-diisopropylaminoethyl(meth)acrylate, 2-(N,N-dimethylamino)ethyl(meth)acrylamide, 2-(N,N-diethylamino)ethyl(meth)acrylamide, 3-(N,N-diethylamino)propyl(meth)acrylamide and 3-(N,N-dimethylamino)propyl (meth)acrylamide.

12. The ink composition according to claim 2, wherein a combination of at least one oxetane compound and at least one compound selected from an epoxy compound and a vinyl ether compound is used as the polymerizable compound (c).

13. The ink composition according to claim 2, the ink composition further comprising a polymerization initiator (d).

14. The ink composition according to claim 13, wherein the polymerizable compound (c) is a radically polymerizable compound, and the polymerization initiator (d) is a photoradical generator.

15. The ink composition according to claim 13, wherein the polymerizable compound (c) is a cationic polymerizable compound, and the polymerization initiator (d) is a photoacid generator.

16. The ink composition according to claim 6, wherein the polymerizable oligomer is an oligomer represented by the following formula (2):

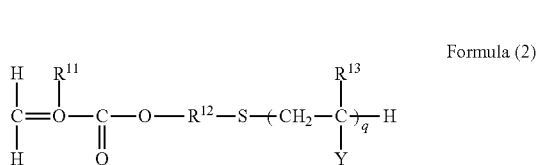

Formula (2)

wherein $R^{11}$ and $R^{13}$ each independently represent a hydrogen atom or a methyl group; $R^{12}$ represents an alkylene group having 1 to 12 carbon atoms; and Y represents a phenyl group or —$COOR^{14}$ wherein the phenyl group may be substituted by an alkyl group having 1 to 4 carbon atoms; and $R^{14}$ represents an alkyl group having 1 to 10 carbon atoms or a phenyl group.

17. The ink composition according to claim 6, wherein the polymerizable oligomer is an oligomer represented by the following formula (3):

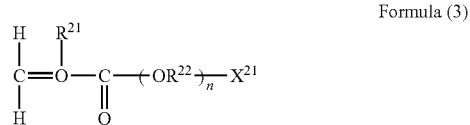

Formula (3)

wherein $R^{21}$ represents a hydrogen atom or a methyl group; $R^{22}$ represents an alkylene group having 1 to 8 carbon atoms; $X^{21}$ represents —$OR^{23}$ or —$OCOR^{24}$, wherein $R^{23}$ and $R^{24}$ each independently represent a hydrogen atom, an alkyl group or an aryl group; and n denotes a number from 2 to 200.

18. The ink composition according to claim 6, wherein the polymer (b) is a copolymer with a monomer which further comprises a nitrogen atom-containing group.

19. The ink composition according to claim 18, wherein the monomer having a nitrogen atom-containing group and an ethylenically unsaturated double bond is represented by the following formula (4):

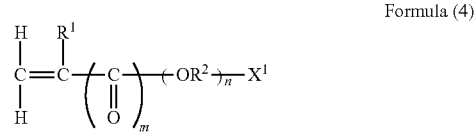

Formula (4)

wherein $R^1$ represents a hydrogen atom or a methyl group; $R^2$ represents an alkylene group having 1 to 12 carbon atoms; X' represents —$N(R^3)(R^4)$, —$R^5$—$N(R^6)(R^7)$ or a basic heterocyclic group containing nitrogen; $R^3$, $R^4$, $R^6$ and $R^7$ each independently represent a hydrogen atom, an alkyl group having 1 to 18 carbon atoms, or an aryl group having 6 to 18 carbon atoms; $R^5$ represents an alkylene group having 1 to 12 carbon atoms; and m and n each independently denote 1 or 0.

20. The ink composition according to claim 9, wherein the repeating unit represented by formula (1) is a repeating unit represented by formula M-4 or M-13:

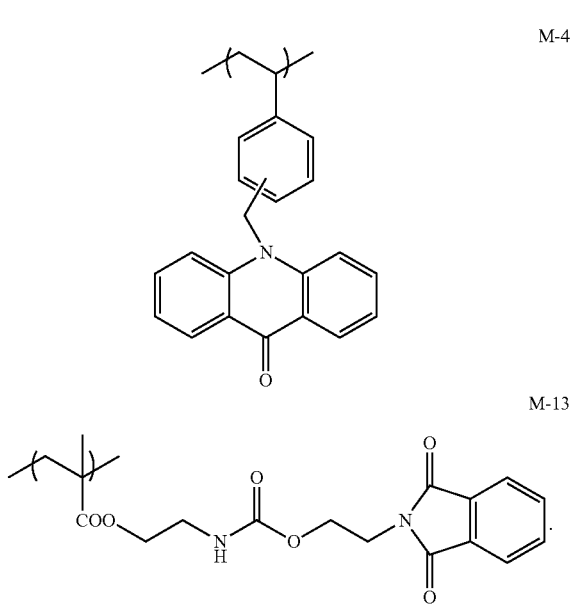

21. An image forming method comprising: applying an ink composition comprising at least a colorant (a) and a polymer (b) on a recording medium by printing, and irradiating the applied ink composition with an active energy ray to cure the composition,
wherein the polymer (b) is a colorant dispersant and contains a repeating unit represented by the following formula (1):

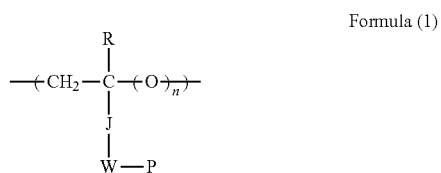

Formula (1)

wherein R represents a hydrogen atom or a methyl group; J represents —CO—, —COO—, —$CONR^1$—, —OCO—, a methylene group or a phenylene group; $R^1$ represents a hydrogen atom, an alkyl group or an aryl group; n denotes 0 or 1; W represents a single bond or a divalent connecting group; and P represents a heterocyclic moiety, wherein a hetero ring of the heterocyclic moiety is selected from the group consisting of benzimidazolone, quinoline, acridine, acridone, phthalimide, quinaldine and quinophthalone.

22. The image forming method according to claim 21, wherein the repeating unit represented by formula (1) is selected from the group consisting of repeating units represented by formulas M-1, M-3, M-4, M-13, M-14 and M-17:

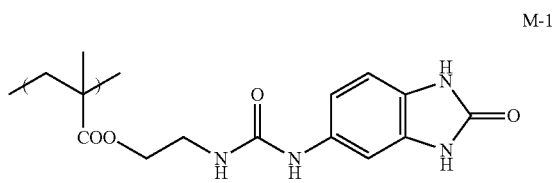

M-3

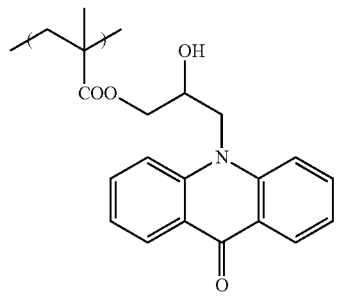

M-4

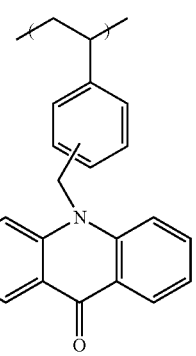

M-13

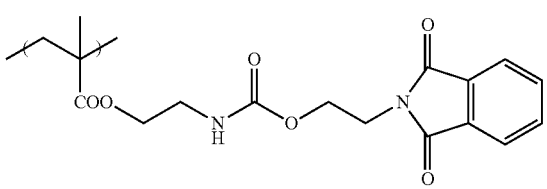

M-14

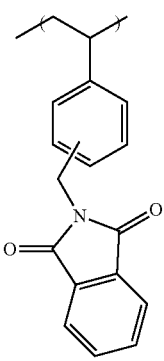

M-17

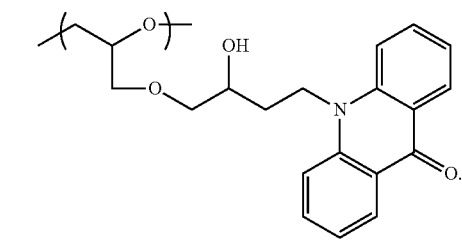

23. The image forming method according to claim 21, wherein J represents —CONR¹—, —OCO—, a methylene group or a phenylene group.

24. The image forming method according to claim 21, wherein the polymer (b) includes a repeating unit derived from a monomer selected from the group consisting of N,N-dimethylaminoethyl(meth)acrylate, N,N-dimethylaminopropyl(meth)acrylate, N,N-diethylaminoethyl(meth)acrylate, N,N-diisopropylaminoethyl(meth)acrylate, 2-(N,N-dimethylamino)ethyl(meth)acrylamide, 2-(N,N-diethylamino)ethyl(meth)acrylamide, 3-(N,N-diethylamino)propyl(meth)acrylamide and 3-(N,N-dimethylamino)propyl(meth)acrylamide.

25. The image forming method according to claim 22, wherein the repeating unit represented by formula (1) is a repeating unit represented by formula M-4 or M-13:

M-4

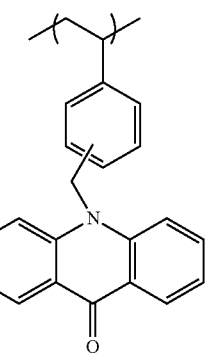

M-13

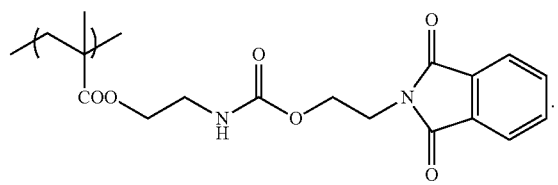

26. A printed article obtained by curing an ink composition comprising at least a colorant (a) and a polymer (b),
wherein the polymer (b) is a colorant dispersant and contains a repeating unit represented by the following formula (1):

Formula (1)

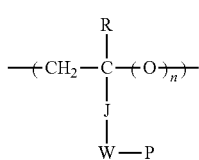

wherein R represents a hydrogen atom or a methyl group; J represents —CO—, —COO—, —CONR¹—, —OCO—, a methylene group or a phenylene group; R¹ represents a hydrogen atom, an alkyl group or an aryl group; n denotes 0 or 1; W represents a single bond or a divalent connecting group; and P represents a heterocyclic moiety, wherein a hetero ring of the heterocyclic moiety is selected from the group consisting of benzimidazolone, quinoline, acridine, acridone, phthalimide, quinaldine and quinophthalone.

27. The printed article according to claim 26, wherein the printed article is obtained by applying the ink composition to a recording medium by printing using an inkjet printer and then irradiating the ink composition with an active energy ray to cure the ink composition.

28. The printed article according to claim 26, wherein the repeating unit represented by formula (1) is selected from the group consisting of repeating units represented by formulas M-1, M-3, M-4, M-13, M-14 and M-17:

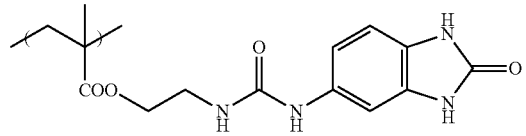

M-1

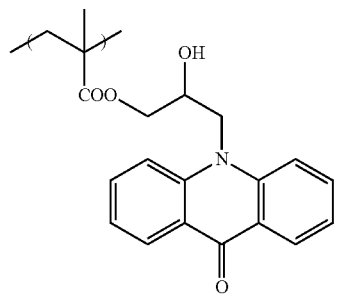

M-3

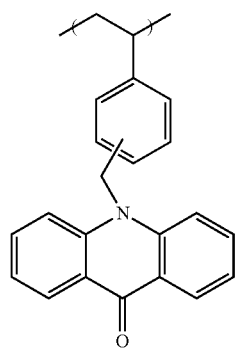

M-4

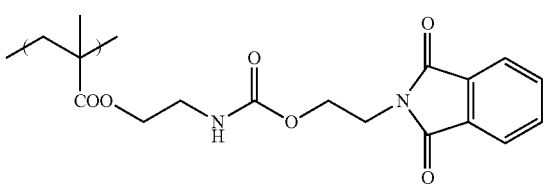

M-13

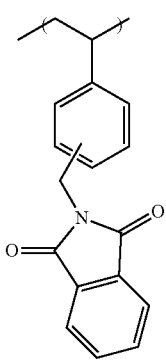

M-14

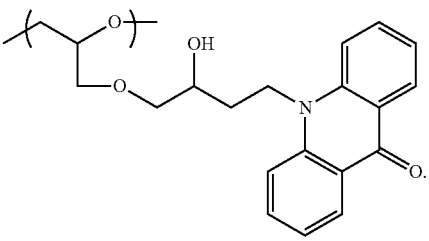

M-17

29. The printed article according to claim 26, wherein J represents —CONR¹—, —OCO—, a methylene group or a phenylene group.

30. The printed article according to claim 26, wherein the polymer (b) includes a repeating unit derived from a monomer selected from the group consisting of N,N-dimethylaminoethyl(meth)acrylate, N,N-dimethylaminopropyl(meth)acrylate, N,N-diethylaminoethyl(meth)acrylate, N,N-diisopropylaminoethyl(meth)acrylate, 2-(N,N-dimethylamino)ethyl(meth)acrylamide, 2-(N,N-diethylamino)ethyl(meth)acrylamide, 3-(N,N-diethylamino)propyl(meth)acrylamide and 3-(N,N-dimethylamino)propyl(meth)acrylamide.

31. The printed article according to claim 28, wherein the repeating unit represented by formula (1) is a repeating unit represented by formula M-4 or M-13:

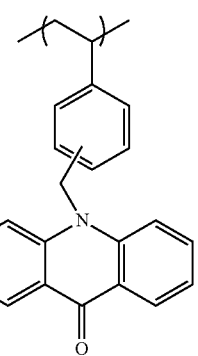

M-4

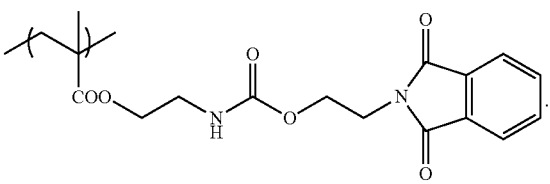

M-13

* * * * *